(12) United States Patent
Sakai

(10) Patent No.: US 11,789,678 B2
(45) Date of Patent: Oct. 17, 2023

(54) PRINTING APPARATUS AND PRINTING SYSTEM

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/811,081

(22) Filed: Jul. 7, 2022

(65) Prior Publication Data

US 2023/0008439 A1 Jan. 12, 2023

(51) Int. Cl.
*G06F 3/12* (2006.01)
*H04W 72/0453* (2023.01)

(52) U.S. Cl.
CPC .......... *G06F 3/1236* (2013.01); *G06F 3/1205* (2013.01); *G06F 3/1253* (2013.01); *H04W 72/0453* (2013.01); *G06F 3/1204* (2013.01)

(58) Field of Classification Search
CPC .... G06F 3/1236; G06F 3/1205; G06F 3/1253; G06F 3/1204; G06F 3/1285; H04W 72/0453; B41J 2/01; B41J 29/393
USPC ...................................................... 358/1.15
See application file for complete search history.

(56) References Cited

U.S. PATENT DOCUMENTS

| 11,556,285 | B2 * | 1/2023 | Kawamura | ........... G06F 3/1239 |
| 2004/0190057 | A1 * | 9/2004 | Takahashi | ............. G06F 3/1205 |
| | | | | 358/1.15 |
| 2010/0053680 | A1 * | 3/2010 | Sato | ....................... G03G 15/50 |
| | | | | 358/1.15 |

FOREIGN PATENT DOCUMENTS

JP 2020-160948 A 10/2020

\* cited by examiner

*Primary Examiner* — Darryl V Dottin
(74) *Attorney, Agent, or Firm* — Global IP Counselors, LLP

(57) ABSTRACT

A printing apparatus displays a setting screen on a display portion. The printing apparatus includes: a communication portion that transmits and receives communication data; a setting portion that associates a setting corresponding to a user's input via the setting screen with the communication data received by the communication portion; a storage portion in which the communication data and the setting are stored in association with each other; a control portion that performs control related to communication of the communication data, based on the stored setting; and a printing portion that performs printing.

9 Claims, 16 Drawing Sheets

FIG. 13

| FILE NAME | FACSIMILE | ETHERNET | Wi-Fi | INTERNET |
|---|---|---|---|---|
| 2021001.pdf | ENABLED | ENABLED | ENABLED | ENABLED |
| 2021002.pdf | DISABLED | ENABLED | DISABLED | DISABLED |
| 2021003.jpeg | ENABLED | ENABLED | ENABLED | DISABLED |
| 2021004.jpeg | DISABLED | AUTOMATIC | DISABLED | DISABLED |
| 2021005.tif | ENABLED | ENABLED | ENABLED | DISABLED |

PRINTING APPARATUS AND PRINTING SYSTEM

The present application is based on, and claims priority from JP Application Serial Number 2021-114058, filed Jul. 9, 2021, the disclosure of which is hereby incorporated by reference herein in its entirety.

BACKGROUND

1. Technical Field

The present disclosure relates to a printing apparatus and a printing system.

2. Related Art

A communication apparatus has been available that connects with a plurality of networks, considering security and functionality. A communication apparatus disclosed in JP-A-2020-160948 is an image forming apparatus having a printer function. The image forming apparatus includes a plurality of interfaces, and the interfaces and settings of a proxy server are stored in the image forming apparatus in association with each other. The image forming apparatus switches between the interfaces to connect to the networks. The image forming apparatus specifies the interface to be used, in association with a user, an output destination, and so on and switches the network.

Although the image forming apparatus in JP-A-2020-160948 switches a network to which it connects, depending on a user and an output destination, no description has not been given of a configuration for communication data that is communicated by the image forming apparatus.

SUMMARY

According to an aspect of the present disclosure, there is provided a printing apparatus that displays a setting screen on a display portion, the printing apparatus includes: a communication portion that transmits and receives communication data; a setting portion that associates a setting corresponding to a user's input via the setting screen with the communication data received by the communication portion; a storage portion in which the communication data and the setting are stored in association with each other; a control portion that performs control related to communication of the communication data, based on the stored setting; and a printing portion that performs printing.

According to another aspect of the present disclosure, there is provided a printing system including a printing apparatus and a storage device, the printing system includes: a communication portion that transmits and receives communication data; a setting portion that associates a setting corresponding to a user's input via a setting screen with the communication data received by the communication portion; a control portion that performs control related to communication of the communication data, based on the setting corresponding to the communication data; a printing portion that performs printing; and a storage portion in which the setting and the communication data are stored in association with each other.

BRIEF DESCRIPTION OF THE DRAWINGS

FIG. 13 is a table illustrating pieces of print data stored in a storage device.

DESCRIPTION OF EXEMPLARY EMBODIMENTS

Figure 1:
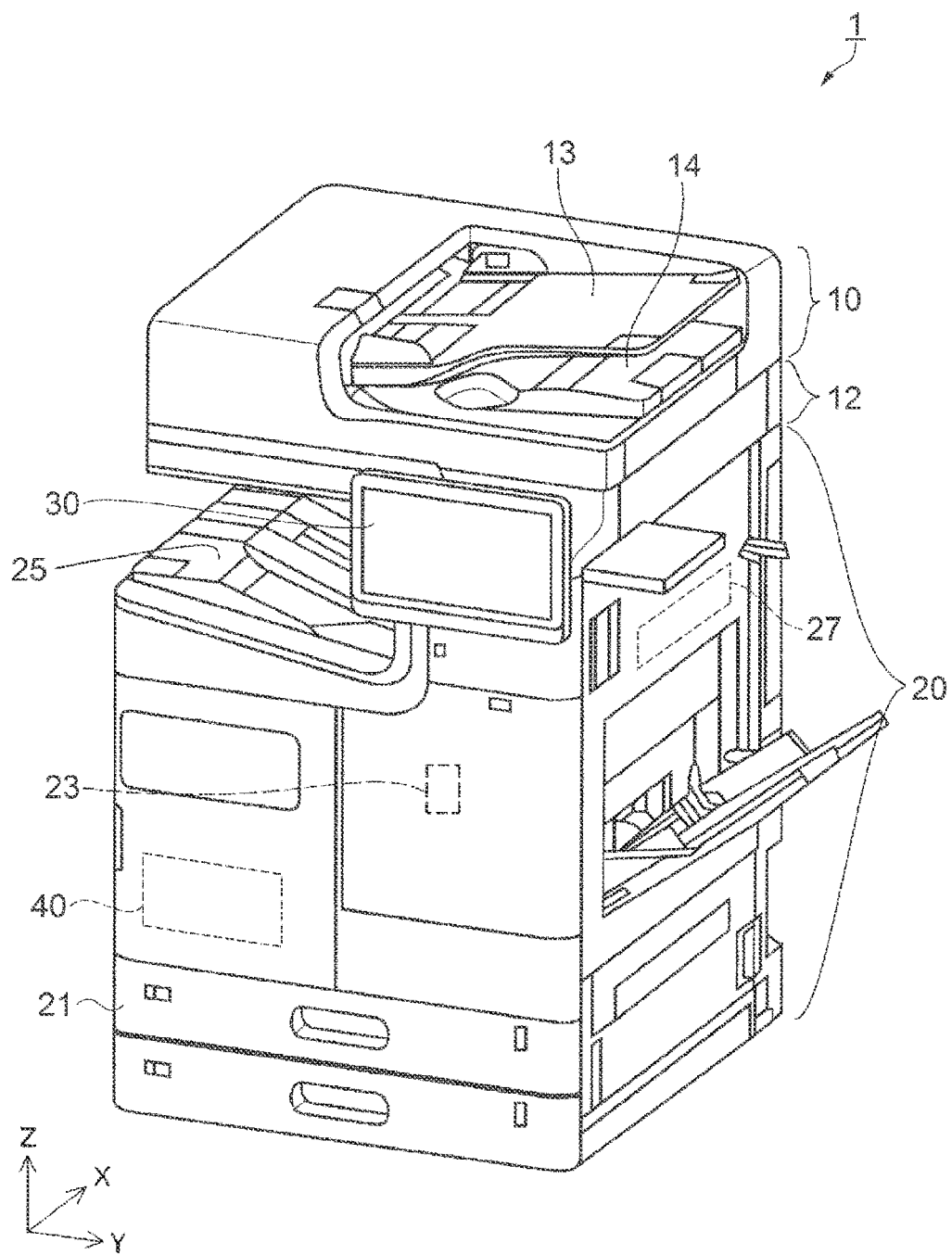
FIG. 1 is a view illustrating an overview of a printer.

FIG. 1 is a perspective view illustrating an overview of a printer 1. The printer 1 corresponds to one example of a printing apparatus. The printer 1 includes a reading unit 10 that reads originals, a printing unit 20 that performs printing, and a display 30. The printer 1 has a print function for performing printing to a medium and a copy function for reading an original and printing read data to a medium. The printer 1 may further have a scan function for reading an original, generating read data, and storing the read data and a facsimile function for sending the read data or externally received data by facsimile. The facsimile function has a function for receiving facsimile data from outside. The printer 1 may also have a transmission function for transmitting the read data or externally received data to an external device. The printer 1 may have a phone-call function for making a call and a mail function for sending mail.

The reading unit 10 is mounted on a reading-unit mounting base 12. The reading unit 10 includes a placement tray 13 on which originals are placed and an original ejection tray 14 to which the originals transported along a transport path are ejected. The reading unit 10 transports the originals placed on the placement tray 13 to the original ejection tray 14 along the transport path. The transport path in the reading unit 10 is provided with a reading sensor, not illustrated. The reading sensor reads images formed on the originals. The reading unit 10 corresponds to one example of a reading portion.

The printing unit 20 includes a paper feeding cassette 21 in which media are placed, a printing mechanism 23, a printed-matter ejection tray 25 to which media printed by the printing mechanism 23 are ejected, a processor 27 that performs various types of control, and a storage device 40. Although the printing mechanism 23 in the present embodiment has an ink-jet print head that performs recording by discharging ink to a medium, it may be implemented by a mechanism other than the ink-jet print head. The printing unit 20 corresponds to one example of a printing portion.

The printing unit 20 may have a post-processing mechanism, not illustrated, as an option. The post-processing mechanism performs various processes on printed matter on which the printing unit 20 was performed. Examples of the processes executed by the post-processing mechanism include staple processing for binding a plurality of pieces of printed matter by using needles or the like, punch processing for creating holes in printed matter, fold processing for folding printed matter in half or the like, and shift processing for shifting, for each copy, a plurality of pieces of printed matter and ejecting the printed matter. The post-processing mechanism performs one or more of the processes described above.

Based on display data, the display 30 displays an operation screen and so on with which operation of the printer 1 and so on are performed. Details of the operation screen are described later. The display data is received via an input/output interface 70 described below. The display 30 may be a touch panel that receives a touch operation performed by a user. Although the printer 1 illustrated in FIG. 1 has the display 30, the present disclosure is not limited thereto. The display 30 may be an external unit connected to the printer 1.

Figure 2:
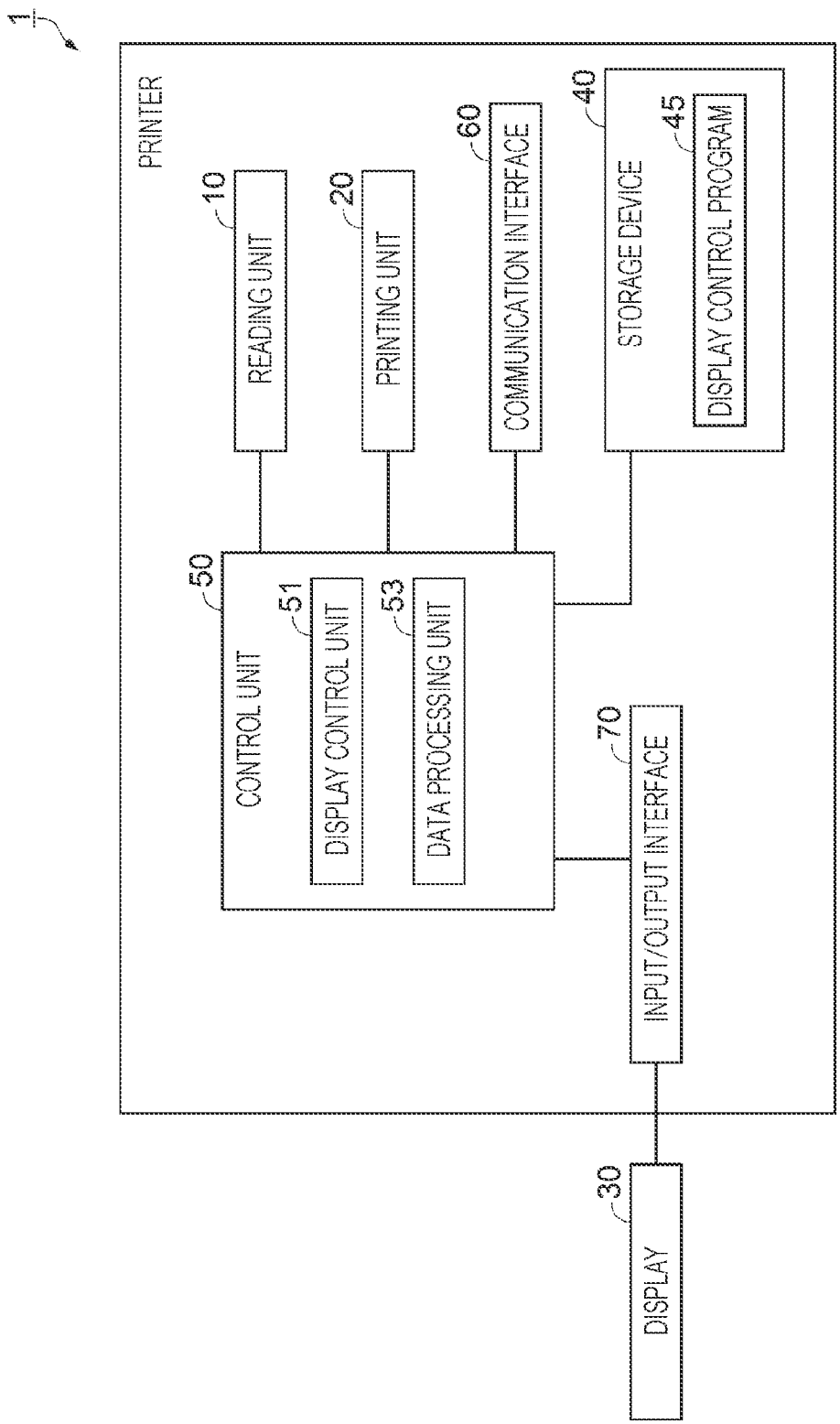
FIG. 2 is a diagram illustrating functional blocks of the printer.

FIG. 2 illustrates functional blocks of the printer 1. The functional blocks in FIG. 2 illustrate a case in which the external display 30 is connected to the printer 1. The printer 1 includes the reading unit 10, the printing unit 20, the storage device 40, a control unit 50, a communication interface 60, and the input/output interface 70. The display 30 is connected to the printer 1.

The display 30 includes a panel, such as a liquid-crystal panel or an organic electro-luminescent (EL) panel, and displays the operation screen or the like, based on the display data. The display 30 may be a touch panel including a touch sensor, which is not illustrated. The touch sensor detects various touch operations input by the user. The display 30 receives various types of display data from the printer 1 and performs display on the basis of the received display data. The display 30 corresponds to one example of a display portion.

The storage device 40 stores therein various programs, such as a reading-control program for controlling the operation of the reading unit 10, a print-control program for controlling the operation of the printing unit 20, and a display control program 45 for controlling display of the display 30. These programs may be constituted by one or more packages. The storage device 40 stores therein various types of data including print data described below. The print data represents data that the printer 1 uses for printing. The print data includes data in a general-purpose file format, such as pdf, print job transmitted from a printer driver of an external device, and so on. The print data corresponds to one example of communication data. The display control program 45 controls various types of display to be displayed on the display 30. Examples of the control include control for switching the operation screen and control for changing display forms, such as various icons displayed on the operation screen. The storage device 40 is implemented by a semiconductor storage element, such as a flash read-only memory (ROM) or a solid-state drive (SSD), or another type of nonvolatile storage device. The storage device 40 may include a random-access memory (RAM) that provides a work area. The storage device 40 may be implemented by a magnetic storage device, such as a hard disk drive (HDD), or a combination of a magnetic storage device and a semiconductor storage device. The storage device 40 corresponds to one example of a storage portion.

The control unit 50 controls the individual portions in the printer 1. The control unit 50 is a controller including the processor 27. The control unit 50 executes various types of program stored in the storage device 40. The control unit 50 sends various types of data to the input/output interface 70, described below, or receives various types of data therefrom. Data received via the input/output interface 70 includes an instruction from the user. Based on the instruction received from the user, the control unit 50 controls the reading unit 10, the printing unit 20, the display 30, the storage device 40, the communication interface 60, and the input/output interface 70. The control unit 50 corresponds to one example of a control portion.

The control unit 50 includes a display control unit 51 and a data processing unit 53. The display control unit 51 is a functional portion that is realized by the control unit 50 executing the display control program 45. The display control unit 51 generates display data to be transmitted to the display 30. The display control unit 51 transmits the generated display data to the display 30 to control display of the display 30. The display control unit 51 receives various instructions from the user via the input/output interface 70. The display control unit 51 generates, as display data, setting-screen data for causing a setting screen to be displayed on the display 30. By using the setting screen, the user inputs settings, such as communication settings, related to print data. The display control unit 51 corresponds to one example of a display control portion. The setting-screen data corresponds to one example of screen information.

The data processing unit 53 adds various settings to the print data. The data processing unit 53 adds, to the print data, settings based on information that the user inputs by using the setting screen. The print data to which the settings are added is stored in the storage device 40. The data processing unit 53 adds settings to the print data, based on information pre-input by an administrator of the printer 1. The data processing unit 53 adds settings to the print data by a method, such as adding a tag including settings, incorporating settings into the print data, or the like. The data processing unit 53 corresponds to one example of a setting portion.

The communication interface 60 communicates with external devices, which are described below in detail with reference to FIG. 3, receives the print data or the like from the external device, and transmits the print data or the like stored in the storage device 40 to the external device. One example of connection between the communication interface 60 and the external device is a local-area connection based on an Ethernet (registered trademark) standard. The local-area connection may be a wired connection using a cable or may be a wireless connection that complies with the Ethernet standard or the like. When the printer 1 has a facsimile function, the communication interface 60 performs facsimile communication connection. When the printer 1 connects with an external server, such as a cloud server or a data server, the communication interface 60 performs Internet connection through an Internet communication network 110. For performing wireless connection using Wi-Fi (registered trademark) communication connection, the communication interface 60 may perform the connection through a public wireless local area network (LAN) line. The communication interface 60 corresponds to one example of a communication portion. Two communication channels of a communication channel used for local-area connection, a communication channel used for Internet connection, a communication channel used for Wi-Fi communication connection, and a communication channel used for facsimile communication connection correspond to one example of a first communication channel and a second communication channel.

The input/output interface 70 connects with the display 30 to output the display data to the display 30. The input/output interface 70 connects with an input appliance, not illustrated, to receive input data, such as an instruction from the user. The input appliance may be an operation panel included in the printer 1 or may be a mouse or the like connected to the printer 1. When the display 30 includes a touch sensor, the input data may be data detected by a touch sensor. The input/output interface 70 may be implemented by an input/output terminal that is connected to a cable, such as a Universal Serial Bus (USB) cable, in a wired manner or may be a wireless communication element, such as proximity wireless communication.

Figure 3:
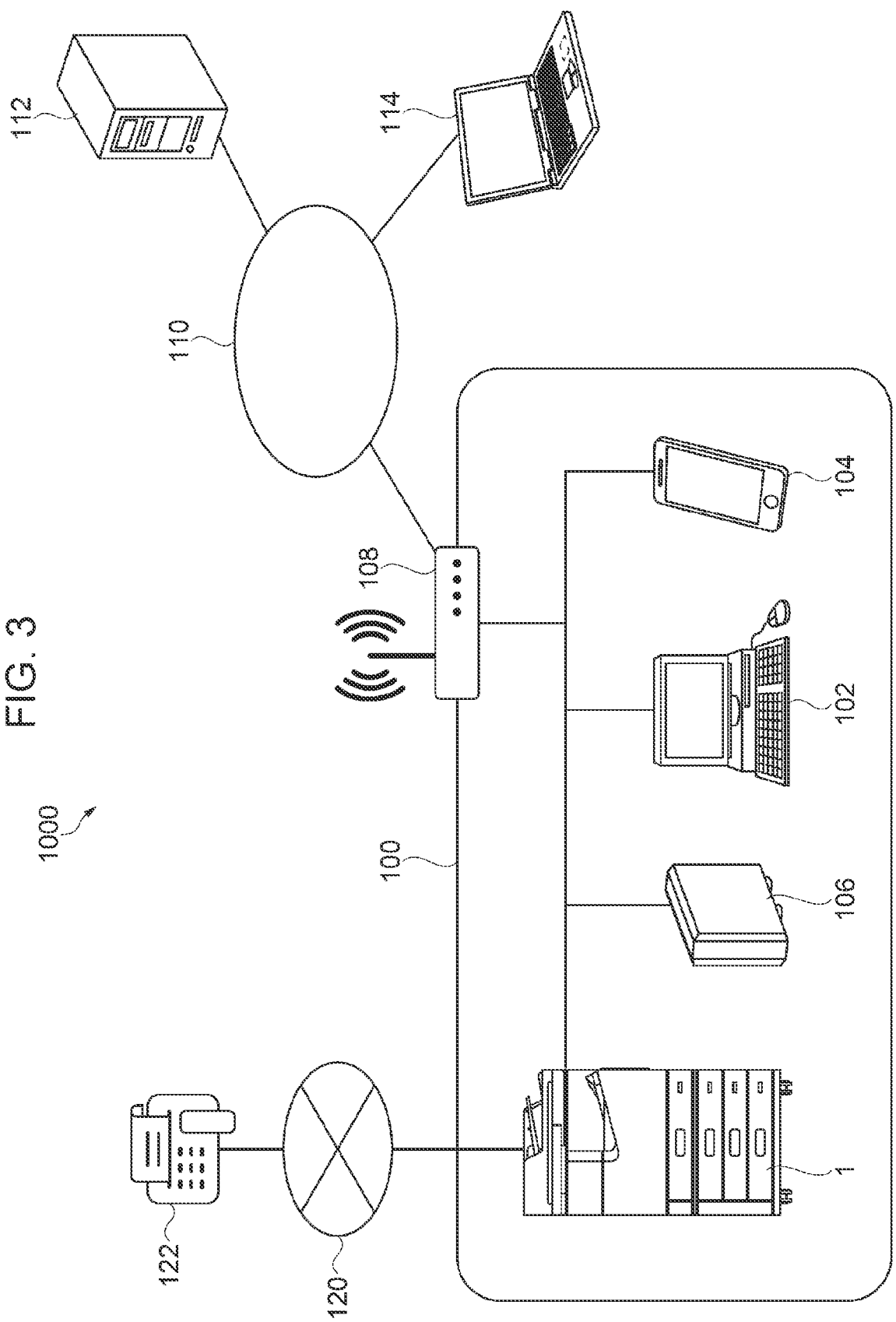
FIG. 3 is a diagram illustrating a printing system including the printer.

FIG. 3 illustrates a printing system 1000 including the printer 1. FIG. 3 illustrates various communication networks and appliances connected to the communication networks. In FIG. 3, the appliances other than the printer 1 are external devices. The printer 1 connects with the various appliances through a local area network 100, an Internet communication network 110, and a telephone communication network 120.

The local area network 100 connects the various appliances by using the Ethernet standard. FIG. 3 illustrates a case in which the printer 1, a personal computer (PC) 102, a tablet terminal 104, an HDD 106, and a router 108 are connected as the appliances. The printer 1, the PC 102, the HDD 106, and the router 108 are connected to each other using LAN cables. The printer 1 transmits/receives the print data and so on to/from the PC 102 and the HDD 106 in the local area network 100. The tablet terminal 104 wirelessly connects with the router 108 through the Wi-Fi communication connection to transmit/receive the print data and so on to/from the printer 1 and the PC 102 in the local area network 100. The tablet terminal 104 and the printer 1 may transmit/receive the print data and so on through the Wi-Fi communication connection. The router 108 connects the local area network 100 and the Internet communication network 110.

The Internet communication network 110 is a communication network in which the appliances are connected based on an Internet protocol. FIG. 3 illustrates a case in which a server 112 and a notebook PC 114 connect to each other through the Internet communication network 110. The server 112 and the notebook PC 114 connect to the printer 1 through the Internet communication network 110 and the router 108 to perform transmission/reception of the print data and so on. The server 112 and the notebook PC 114 connect to the PC 102 and the tablet terminal 104 in the local area network 100 through the Internet communication network 110 and the router 108.

The telephone communication network 120 includes a telephone line through which facsimile data is transmitted/received. FIG. 3 illustrates a case in which a facsimile 122 is connected to the telephone communication network 120. The printer 1 transmits/receives facsimile data to the facsimile 122 through the telephone communication network 120. The facsimile data corresponds to one example of print data.

Two of a communication channel between the printer 1 and the PC 102 in the local area network 100, a communication channel between the printer 1 and the tablet terminal 104 by using a Wi-Fi communication connection, a communication channel between the printer 1 and the server 112 through the Internet communication network 110, a communication channel between the printer 1 and the notebook PC 114 through the Internet communication network 110, and a communication channel between the printer 1 and the facsimile 122 through the telephone communication network 120 correspond to one example of the first communication channel and the second communication channel. By using those communication channels, the printer 1 receives or transmits the print data. By using the communication channels, the printer 1 can receive the print data and so on from each terminal or transmit the print data and so on thereto.

First Embodiment

Figure 4:
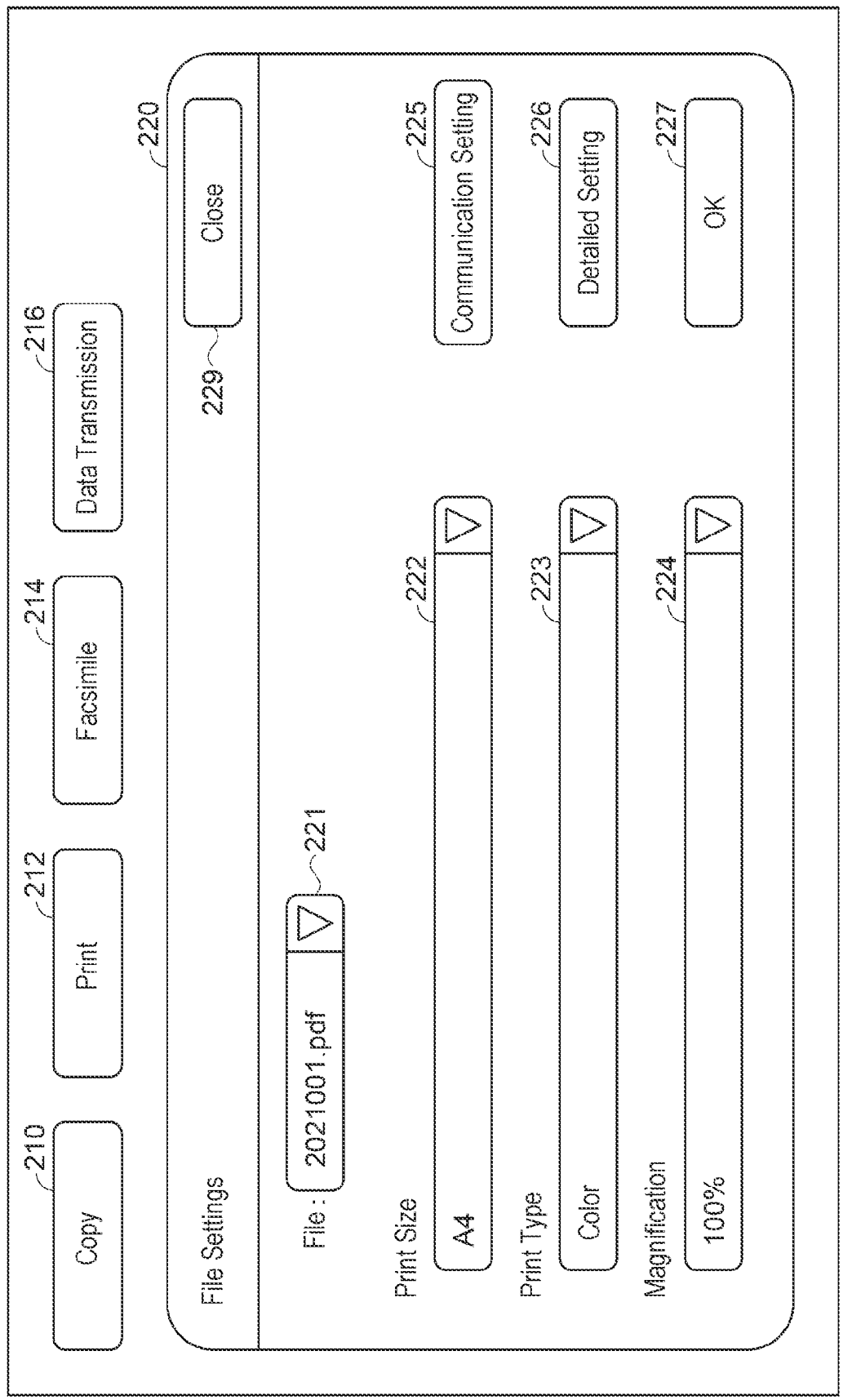
FIG. 4 is a view illustrating a file setting screen.

In a first embodiment, a description will be given of a case in which the user of the printer 1 performs setting on the print data. Each operation screen in the first embodiment is a screen displayed on the display 30, which has a touch sensor. FIG. 4 illustrates a file setting screen 201, which is one of a plurality of operation screens. The file setting screen 201 displays a copy instruction button 210, a print instruction button 212, a facsimile instruction button 214, a data transmission instruction button 216, and a file setting list 220. The copy instruction button 210, the print instruction button 212, the facsimile instruction button 214, and the data transmission instruction button 216 are headers that are displayed independently of the file setting list 220. The file setting list 220 displays a file setting field 221, a print-size setting field 222, a print-type setting field 223, a magnification setting field 224, a communication setting button 225, a detailed-setting button 226, an OK button 227, and a close button 229.

The copy instruction button 210, the print instruction button 212, the facsimile instruction button 214, and the data transmission instruction button 216 are icons for receiving inputs from the user. When the user performs a touch operation on any of the icons, the display 30 receives an input as an instruction from the user. When the display 30 does not have the touch sensor, the user operates an operation panel, not illustrated, and thereby the control unit 50 receives an instruction from the user.

The copy instruction button 210 receives an input performed by the user. When the copy instruction button 210 receives an input performed by the user, the control unit 50 receives an instruction for copying an original as an instruction from the user and switches the operation screen to a copy setting screen. The print instruction button 212 receives an input performed by the user. When the print instruction button 212 receives an input performed by the user, the control unit 50 receives an instruction for performing printing to a medium as an instruction from the user and switches the operation screen to a print setting screen. The facsimile instruction button 214 receives an input performed by the user. When the facsimile instruction button 214 receives an input performed by the user, the control unit 50 receives a facsimile transmission instruction as an instruction from the user and switches the operation screen to a facsimile setting screen. The data transmission instruction button 216 receives an input performed by the user. When the data transmission instruction button 216 receives an input performed by the user, the control unit 50 receives, via the communication interface 60, a transmission instruction for giving an instruction for transmitting print data or the like to an external device and switches the operation screen to a communication setting screen 202 described below. In one example, when the printer 1 does not include the reading unit 10, the copy instruction button 210 is not displayed on the file setting screen 201.

The file setting list 220 is a list image for making the user input various settings regarding a file of print data or the like. The file setting list 220 displays the file setting field 221, the print-size setting field 222, the print-type setting field 223, the magnification setting field 224, the communication setting button 225, the detailed-setting button 226, the OK button 227, and the close button 229.

The file setting field 221 displays a file name of specified print data. More specifically, the file setting field 221 displays a file name of print data specified by the user, the print data being included in a plurality of pieces of print data stored in the storage device 40. FIG. 4 illustrates a case in which print data with file name "2021001.pdf" is specified.

The print-size setting field 222 displays a medium size input by the user. More specifically, the print-size setting field 222 displays a medium size set for the paper feeding cassette 21 in the printing unit 20. FIG. 4 illustrates a case in which A4 size is specified as the medium size.

The print-type setting field 223 displays a print type input by the user. The print type is color printing, monochrome printing, two-color printing, or the like. FIG. 4 illustrates a case in which the color printing is specified by the user's input as the print type.

The magnification setting field 224 displays a magnification input by the user. The magnification indicates the rate of enlargement or reduction when the printing unit 20 performs printing to a medium. FIG. 4 illustrates a case in which the magnification specified by the user's input is 100%. A magnification of 100% indicates that printing is performed with the same magnification.

The communication setting button 225 receives an input performed by the user. When the communication setting button 225 receives an input performed by the user, the display control unit 51 receives a communication setting instruction for print data as the user's instruction based on the user's input. Upon receiving the communication setting instruction, the display control unit 51 generates setting-screen data for causing the communication setting screen 202 in FIG. 5 to be displayed on the display 30 as an operation screen and transmits the setting-screen data to the display 30.

The detailed-setting button 226 receives an input performed by the user. When the detailed-setting button 226 receives an input performed by the user, the display control unit 51 receives a print detailed-setting instruction as the user's instruction based on the user's input. Upon receiving the print detailed-setting instruction, the display control unit 51 generates detailed setting-screen data for causing a detailed-setting screen, not illustrated, to be displayed on the display 30 and transmits the detailed setting-screen data to the display 30. The detailed-setting screen is a screen for making the user input print settings, which are not displayed in the file setting list 220.

The OK button 227 receives an input performed by the user. When the OK button 227 receives an input performed by the user, the control unit 50 receives, as the user's instruction based on the user's input, various settings set in the file setting list 220. The OK button 227 is displayed on not only the file setting screen 201 but also other setting screens and so on, such as the communication setting screen 202, which is described below. When the OK button 227 displayed on the other setting screen receives an input performed by the user, the display control unit 51 or the data processing unit 53 receives various settings.

The close button 229 receives an input performed by the user. When the close button 229 receives an input performed by the user, the display control unit 51 receives, as an instruction from the user, a non-display instruction for hiding the list image. The close button 229 is displayed on not only the file setting screen 201 but also the communication setting screen 202, described below, and so on. When the close button 229 displayed on the file setting list 220 receives an input performed by the user, the display control unit 51 receives a non-display instruction as an instruction from the user and closes and hides the file setting list 220.

Figure 5:
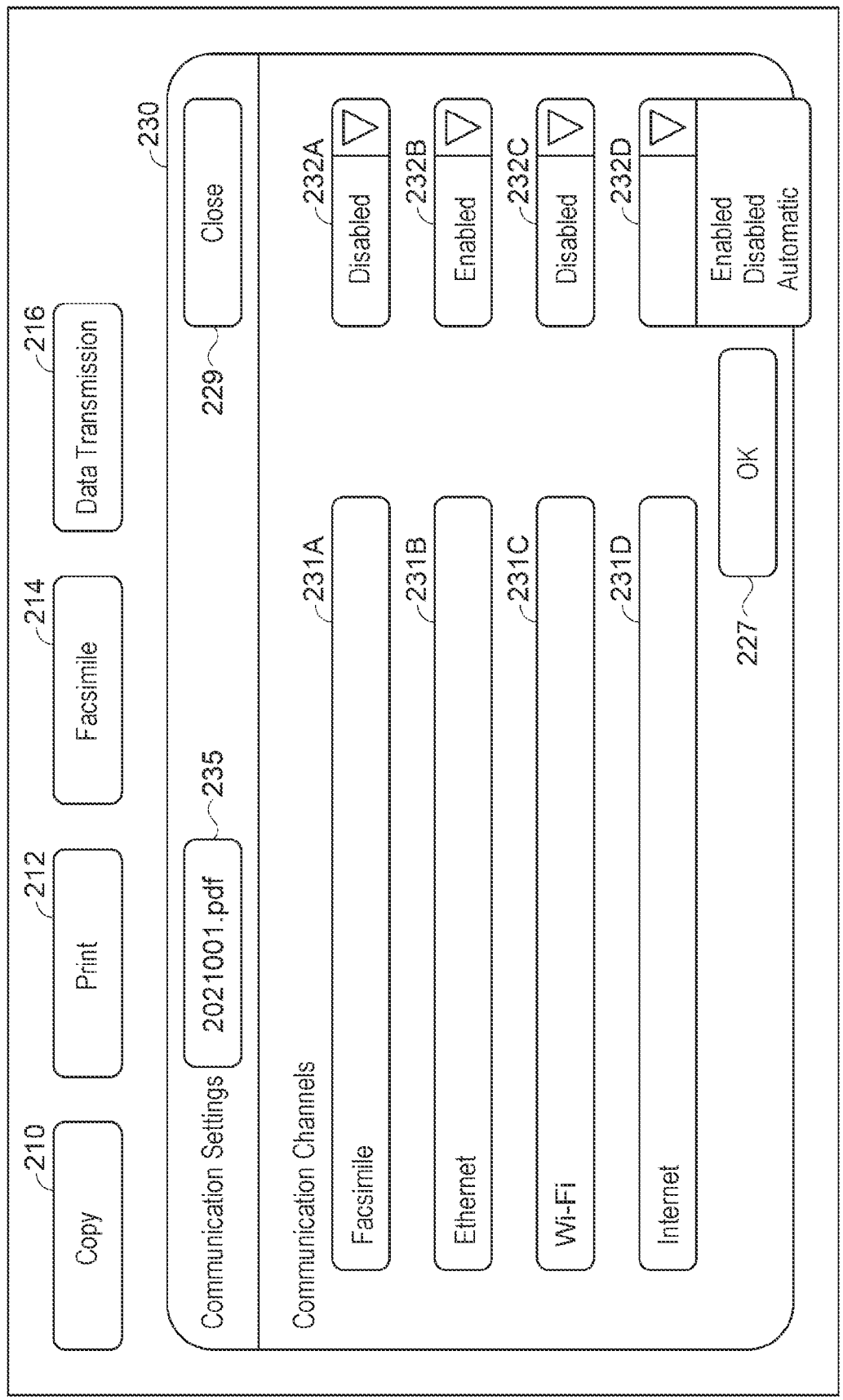
FIG. 5 is a view illustrating a communication setting screen.

FIG. 5 illustrates the communication setting screen 202, which is one of the operation screens. When the user specifies print data with the file setting field 221 in the file setting list 220 in FIG. 4, and the communication setting button 225 receives an input performed by the user, the communication setting screen 202 is displayed on the display 30. The communication setting screen 202 is used when the user performs communication setting on the print data. The communication setting screen 202 is an image displayed on the display 30, based on the setting-screen data that the display control unit 51 transmits to the display 30. The display control unit 51 generates the communication setting screen 202. The communication setting screen 202 corresponds to one example of a setting screen. The setting-screen data for causing the communication setting screen 202 to be displayed on the display 30 is one example of display data and corresponds to one example of screen information.

The communication setting screen 202 displays a copy instruction button 210, a print instruction button 212, a facsimile instruction button 214, a data transmission instruction button 216, and a communication setting list 230. The copy instruction button 210, the print instruction button 212, the facsimile instruction button 214, and the data transmission instruction button 216 are the same as the copy instruction button 210, the print instruction button 212, the facsimile instruction button 214, and the data transmission instruction button 216 displayed on the file setting screen 201.

The communication setting list 230 is a list image for making the user input various settings regarding communication. The communication setting list 230 displays a first communication channel display field 231A, a second communication channel display field 231B, a third communication channel display field 231C, a fourth communication channel display field 231D, a first communication channel setting field 232A, a second communication channel setting field 232B, a third communication channel setting field 232C, a fourth communication channel setting field 232D, an OK button 227, a close button 229, and a set-file display field 235. The OK button 227 and the close button 229 are the same as the OK button 227 and the close button 229 displayed on the file setting screen 201.

The first communication channel display field 231A, the second communication channel display field 231B, the third communication channel display field 231C, and the fourth communication channel display field 231D display information indicating communication channels connected to the printer 1. The printer 1 in the present embodiment is connected to a communication channel used for the local-area connection, a communication channel used for the Internet connection, a communication channel used for the Wi-Fi communication connection, and a communication channel used for the facsimile communication connection. The first communication channel display field 231A, the second communication channel display field 231B, the third communication channel display field 231C, and the fourth communication channel display field 231D display all communication channels connected to the printer 1. When the number of communication channels connected to the printer 1 is three or less, the display control unit 51 generates communication setting-screen data in which the number of communication channel display fields displayed in the communication setting list 230 is reduced and displays the communication setting-screen data on the display 30. When the number of communication channels connected to the printer 1 is five or more, the display control unit 51 generates communication setting-screen data in which the number of communication channel display fields displayed in the communication setting list 230 is increased and displays the communication setting-screen data on the display 30.

The first communication channel display field 231A illustrated in FIG. 5 displays "Facsimile" representing the facsimile communication connection. The facsimile communication connection is, for example, communication using a facsimile communication channel along which the printer 1 and the facsimile 122 in FIG. 3 are connected through the telephone communication network 120. The second communication channel display field 231B in FIG. 5 displays "Ethernet" representing the local-area connection. The local-area connection is, for example, communication using a communication channel along which the printer 1 and the PC 102 in FIG. 3 are connected through a LAN cable by using an Ethernet standard. The third communication channel display field 231C displays "Wi-Fi" representing the Wi-Fi communication connection. The Wi-Fi communication connection is, for example, communication using a Wi-Fi communication channel along which the printer 1 and the tablet terminal 104 in FIG. 3 are wirelessly connected via the router 108. The fourth communication channel display field 231D displays "Internet" representing the Internet connection. The Internet connection is, for example, communication using an Internet communication channel along which the printer 1 and the server 112 in FIG. 3 are connected through the Internet communication network 110.

The first communication channel setting field 232A displays a setting input by the user. The first communication channel setting field 232A displays a setting for the communication channel displayed in the first communication channel display field 231A. The first communication channel setting field 232A in FIG. 5 displays "Disabled" indicating a setting with which communication using the facsimile communication connection is disabled.

The second communication channel setting field 232B displays a setting input by the user. The second communication channel setting field 232B displays a setting for the communication channel displayed in the second communication channel display field 231B. The second communication channel setting field 232B in FIG. 5 displays "Enabled" indicating a setting with which communication using the local-area connection is enabled.

The third communication channel setting field 232C displays a setting input by the user. The third communication channel setting field 232C displays a setting for the communication channel displayed in the third communication channel display field 231C. The third communication channel setting field 232C in FIG. 5 displays "Disabled" indicating a setting with which communication using the Wi-Fi communication connection is disabled.

The fourth communication channel setting field 232D displays a setting input by the user. The fourth communication channel setting field 232D displays a setting for the communication channel displayed in the fourth communication channel display field 231D. The fourth communication channel setting field 232D in FIG. 5 displays "Enabled", "Disabled", and "Automatic" as options. The "Enabled" indicates a setting that permits communication through the communication channel displayed in the fourth communication channel display field 231D. The "Disabled" indicates a setting that disables communication using the communication channel displayed in the fourth communication channel display field 231D. The "Automatic" indicates a setting with which a communication setting for the communication channel displayed in the fourth communication channel display field 231D is an automatic setting. The "Automatic" indicates an automatic setting that the control unit 50 performs based on settings that an administrator of the printer 1 performs with an administrator communication setting screen 204, described below.

The set-file display field 235 displays a file name of print data on which settings are performed. The set-file display field 235 in FIG. 5 displays file name "2021001.pdf" of the print data specified in the file setting field 221 in FIG. 4. The set-file display field 235 displays the file name of print data specified by the user, the print data being included in a plurality of pieces of print data stored in the storage device 40.

Although FIG. 5 illustrates a case in which options are displayed in the fourth communication channel setting field 232D, the same options are also displayed in the first communication channel setting field 232A, the second communication channel setting field 232B, and the third communication channel setting field 232C. When the first communication channel setting field 232A, the second communication channel setting field 232B, the third communication channel setting field 232C, and the fourth communication channel setting field 232D have no inputs performed by the user, they may display blank fields or may display default settings. When the user does not operate the first communication channel setting field 232A, the second communication channel setting field 232B, the third communication channel setting field 232C, and the fourth communication channel setting field 232D, "Automatic" may be displayed therein as a default setting.

When the OK button 227 receives an input performed by the user in a state in which the first communication channel setting field 232A, the second communication channel setting field 232B, the third communication channel setting field 232C, and the fourth communication channel setting field 232D display settings, the data processing unit 53 receives the settings displayed in the communication setting list 230. The data processing unit 53 adds the settings associated with the communication channels to the print data displayed in the set-file display field 235. The settings associated with the communication channels correspond to one example of settings related to communication data. The print data to which the settings are added is stored in the storage device 40.

As described above, the printer 1 displays the setting screen on the display 30. The printer 1 includes: the communication interface 60 that transmits and receives print data; the data processing unit 53 that associates a setting corresponding to a user's input via a setting screen with the print data received by the communication interface 60; the storage device 40 in which the print data and the settings are stored in association with each other; the control unit 50 that performs control related to communication of the print data, based on the settings stored in the storage device 40; and the printing unit 20 that performs printing. This allows the user to perform control-related settings on the print data received by the printer 1.

Figure 6:
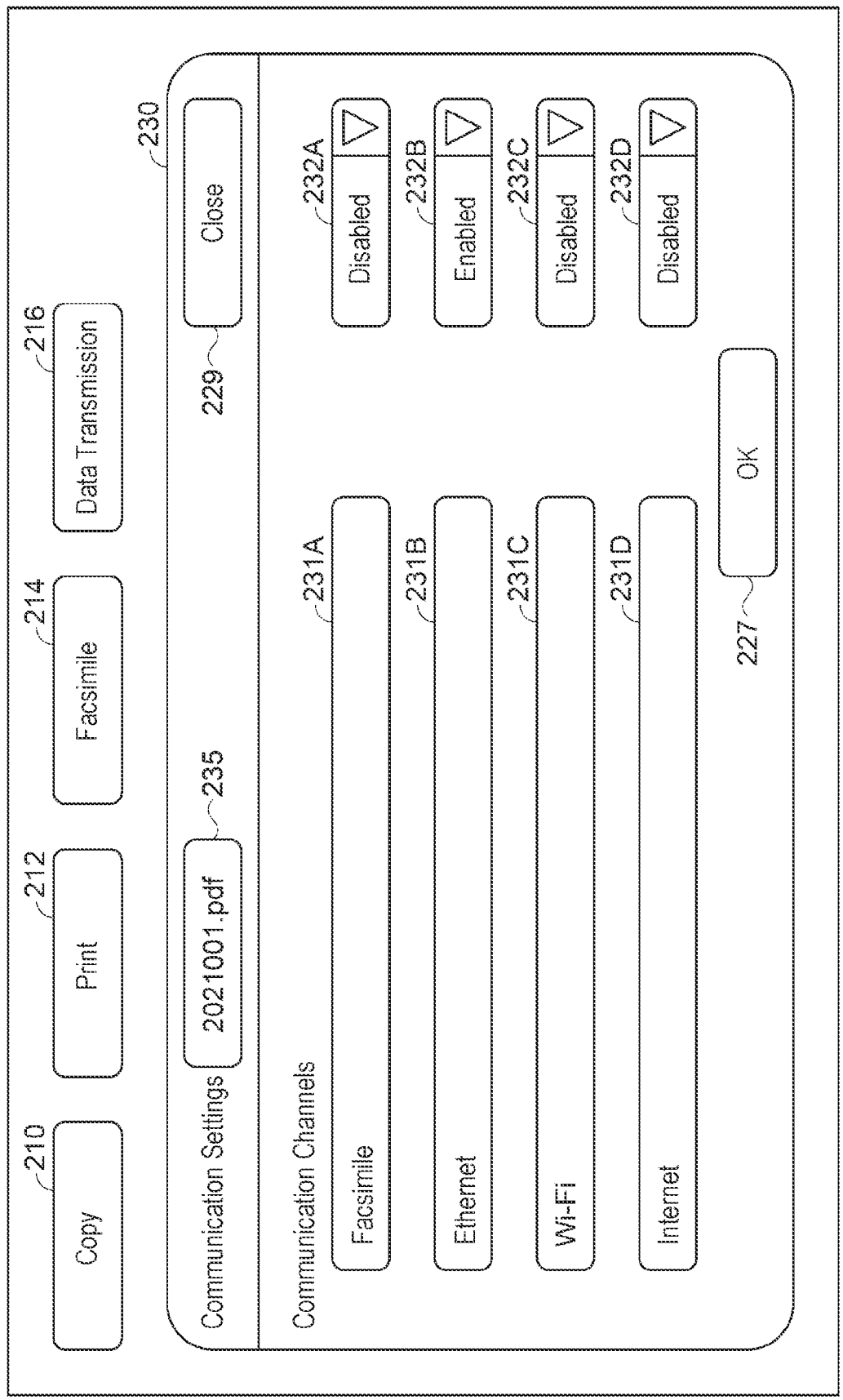
FIG. 6 is a view illustrating the communication setting screen on which communication settings are set.

FIG. 6 illustrates the communication setting screen 202 on which communication settings are set. FIG. 6 illustrates the communication setting screen 202 when communication settings described below are performed on file name "2021001.pdf" specified in the file setting field 221 in FIG. 4. The first communication channel display field 231A in FIG. 6 displays "Facsimile", and the first communication channel setting field 232A in FIG. 6 displays "Disabled". The second communication channel display field 231B in FIG. 6 displays "Ethernet", and the second communication channel setting field 232B in FIG. 6 displays "Enabled". The third communication channel display field 231C in FIG. 6 displays "Wi-Fi", and the third communication channel setting field 232C in FIG. 6 displays "Disabled". The fourth communication channel display field 231D in FIG. 6 displays "Internet", and the fourth communication channel setting field 232D in FIG. 6 displays "Disabled". The set-file display field 235 displays file name "2021001.pdf". FIG. 6 illustrates a setting that permits communication using the Ethernet connection and that does not permit communication using the facsimile communication connection, communication using the Wi-Fi communication connection, and communication using the Internet connection, with respect to the print data with file name "2021001.pdf". The setting that permits communication using the Ethernet connection and that does not permit communication using the facsimile communication connection, communication using the Wi-Fi communication connection, and communication using the Internet connection corresponds to one example of a first setting.

When the OK button 227 receives an input performed by the user, the data processing unit 53 receives the setting that permits communication using the Ethernet connection and that does not permit communication using the facsimile communication connection, communication using the Wi-Fi communication connection, and communication using the Internet connection. The data processing unit 53 adds, to the print data corresponding to the file name displayed in the set-file display field 235, the setting that permits communication using the Ethernet connection and that does not permit communication using the facsimile communication connection, communication using the Wi-Fi communication connection, and communication using the Internet connection. The data processing unit 53 transmits, to the storage device 40, the print data to which the setting is added. The storage device 40 stores the received print data.

Figure 7:
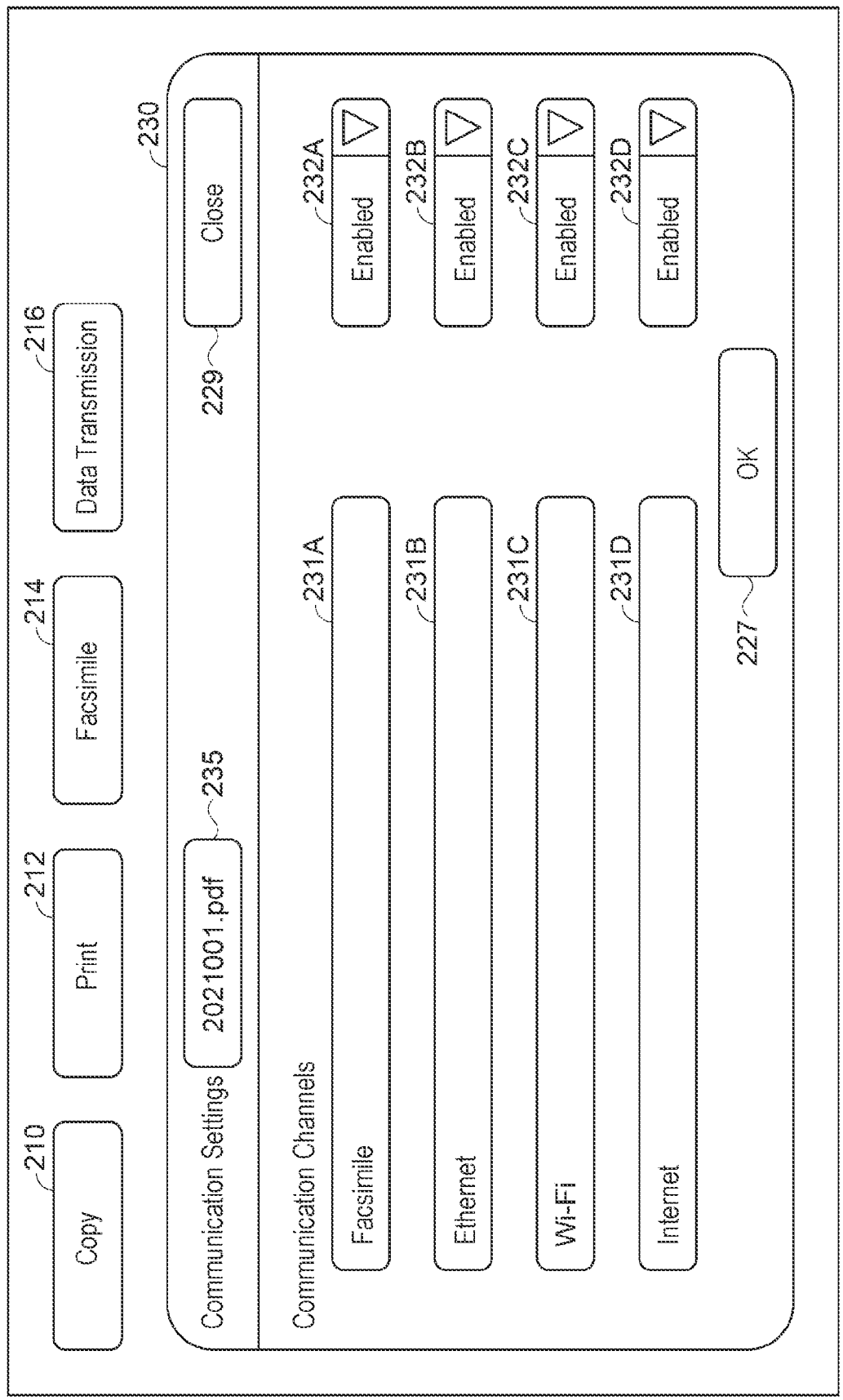
FIG. 7 is a view illustrating the communication setting screen on which communication settings are set.

FIG. 7 illustrates another communication setting screen 202 on which communication settings are set. FIG. 7 illustrates the communication setting screen 202 when communication settings different from FIG. 6 and described below are input with respect to file name "2021001.pdf" specified in the file setting field 221 in FIG. 4. The first communication channel display field 231A in FIG. 7 displays "Facsimile", and the first communication channel setting field 232A in FIG. 7 displays "Enabled". The second communication channel display field 231B in FIG. 7 displays "Ethernet", and the second communication channel setting field 232B in FIG. 7 displays "Enabled". The third communication channel display field 231C in FIG. 7 displays "Wi-Fi", and the third communication channel setting field 232C in FIG. 7 displays "Enabled". The fourth communication channel display field 231D in FIG. 7 displays "Internet", and the fourth communication channel setting field 232D in FIG. 7 displays "Enabled". The set-file display field 235 displays file name "2021001.pdf". FIG. 7 illustrates a setting that permits communication using the Ethernet connection, communication using the facsimile communication connection, communication using the Wi-Fi communication connection, and communication using the Internet connection, with respect to the print data with file name "2021001.pdf". The setting that permits communication using the Ethernet connection, communication using the facsimile communication connection, communication using the Wi-Fi communication connection, and communication using the Internet connection corresponds to one example of a second setting.

When the OK button 227 receives an input performed by the user, the data processing unit 53 receives the setting that permits communication using the Ethernet connection, communication using the facsimile communication connection, communication using the Wi-Fi communication connection, and communication using the Internet connection. The data processing unit 53 adds the received setting that permits communication using the Ethernet connection, communication using the facsimile communication connection, communication using the Wi-Fi communication connection, and communication using the Internet connection to the print data corresponding to the file name displayed in the set-file display field 235. The data processing unit 53 transmits, to the storage device 40, the print data to which the setting is added. The storage device 40 stores the received print data.

As illustrated in FIG. 6, the first setting added to the print data permits transmitting the print data through the Ethernet connection and does not permit transmitting the print data through the facsimile communication connection. Also, the first setting added to the print data does not permit transmitting the print data through the Wi-Fi communication connection and does not permit transmitting the print data through the Internet connection. Alternatively, as illustrated in FIG. 7, the second setting added to the print data permits transmitting the print data through the Ethernet connection and permits transmitting the print data through the facsimile communication connection. The second setting added to the print data permits transmitting the print data through the Wi-Fi communication connection and permits transmitting the print data through the Internet connection. This allows the user to perform setting on the print data for each communication channel. In one example, the user can perform setting for limiting transmitting the print data through the facsimile communication connection in which he or she wants to limit transmission for security reasons.

Figure 8:
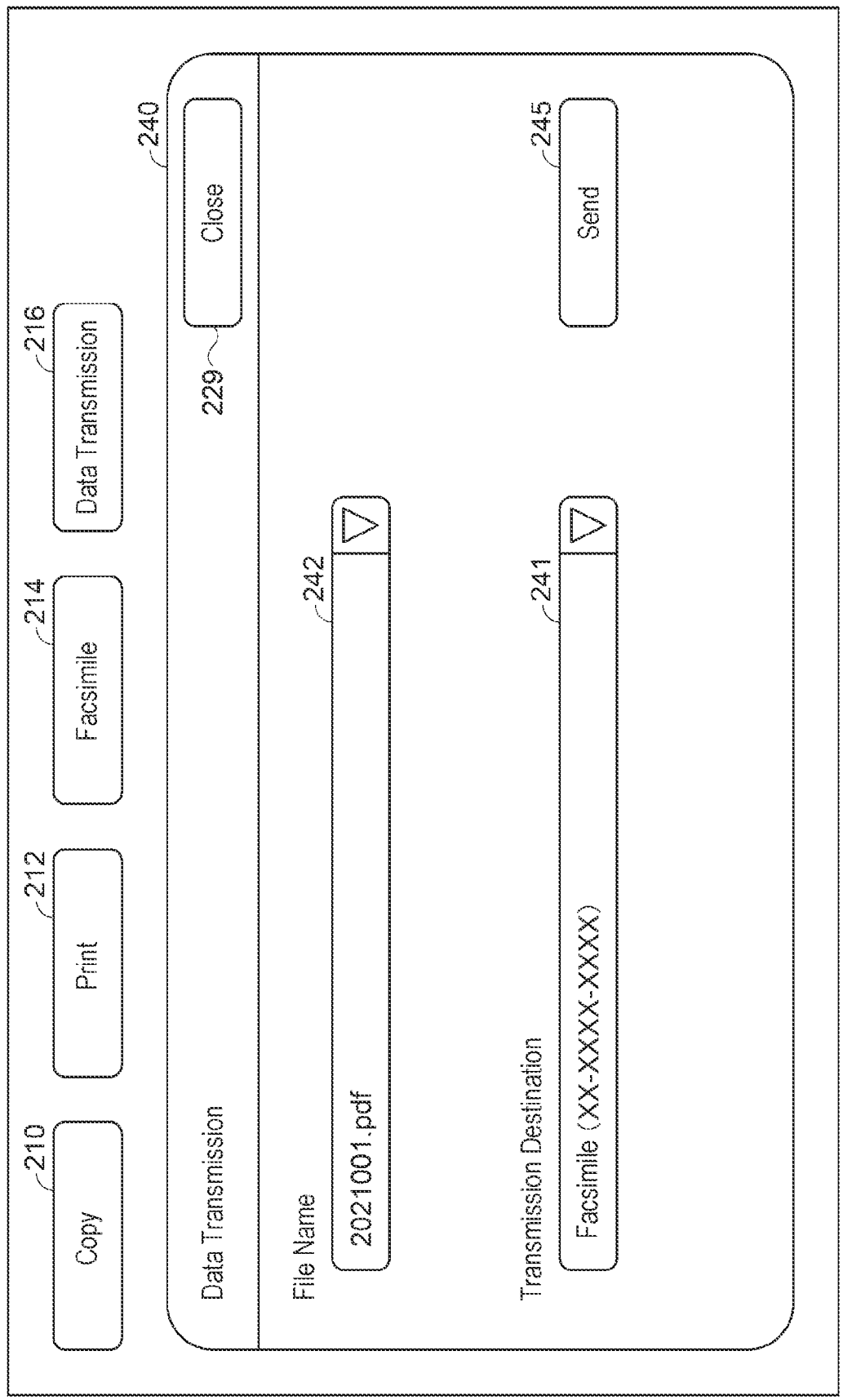
FIG. 8 is a view illustrating a data transmission execution screen.

FIG. 8 illustrates a first data transmission execution screen 203A, which is one of the operation screens. When the data transmission instruction button 216 receives an input performed by the user, the first data transmission execution screen 203A is displayed on the display 30. The first data transmission execution screen 203A displays a data transmission setting list 240. The data transmission setting list 240 displays a transmission-destination setting field 241 and a transmission-file setting field 242.

The transmission-file setting field 242 displays the file name of the specified print data. More specifically, the transmission-file setting field 242 displays the file name of the print data specified by the user, the print data being included in a plurality of pieces of print data stored in the storage device 40. FIG. 8 illustrates a case in which the print data with file name "2021001.pdf" is specified.

The transmission-destination setting field 241 displays a setting of the transmission destination specified by the user. The transmission-destination setting field 241 in FIG. 8 indicates a facsimile with a predetermined telephone number as the transmission destination. The facsimile with the predetermined telephone number corresponds to, for example, the facsimile 122 in FIG. 3. When the transmission destination is the facsimile 122, a channel from the printer 1 to the facsimile 122 through the telephone communication network 120 corresponds to a communication channel.

The file setting field 242 in FIG. 8 displays the file name of print data specified by the user. The specified print data is print data that is stored in the storage device 40 and to which settings are added. FIG. 8 illustrates a case in which file name "2021001.pdf" is specified.

A send button 245 receives an input performed by the user. When the send button 245 receives an input performed by the user, the control unit 50 receives a transmission instruction for transmitting the print data specified in the file setting field 242 to the transmission destination specified in the transmission-destination setting field 241. When the send button 245 on the first data transmission execution screen 203A in FIG. 8 receives an input performed by the user, the control unit 50 receives a transmission instruction for transmitting the print data with file name "2021001.pdf" to telephone number XX-XXXX-XXXX.

Upon receiving the transmission instruction, the control unit 50 obtains the setting added to the print data. The control unit 50 performs control, based on the obtained setting. When the obtained setting is the first setting set with the communication setting screen 202 in FIG. 6, the control unit 50 performs control, based on the first setting set with the communication setting screen 202 in FIG. 6. The first setting set with the communication setting screen 202 in FIG. 6 is a setting that does not permit communication using the facsimile communication connection. Since the received transmission instruction is to perform communication using the facsimile communication channel, the control unit 50 grays out the send button 245 so as not to transmit the specified print data to the facsimile with the predetermined telephone number and issues an error notification indicating that transmitting the print data is not permitted.

If the transmission destination displayed in the transmission-destination setting field 241 in FIG. 8 is the PC 102 in FIG. 3, the control unit 50 receives a transmission instruction for the PC 102. In the case of the first setting, communication using the Ethernet connection is permitted for the print data specified in the file setting field 221. A communication channel from the printer 1 to the PC 102 uses the Ethernet connection, the transmission to the PC 102 is communication using the Ethernet connection. When the control unit 50 receives a transmission instruction for using the Ethernet connection as the communication channel, the control unit 50 transmits the specified print data to the PC 102.

As described above, the control unit 50 performs control for transmitting the print data, based on the user's instruction. The control unit 50 can perform control corresponding to the setting. When the first setting corresponds to the print data, and the user's instruction is to transmit the print data through the Ethernet connection, the control unit 50 performs control for transmitting the print data through the Ethernet. When the first setting corresponds to the print data, and the user's instruction is to transmit the print data through the facsimile communication connection, the control unit 50 performs control for not transmitting the print data through the facsimile communication connection. Based on the setting set for the print data, the printer 1 can perform communication in which the communication channels are limited. In one example, the user can limit transmitting the print data to the facsimile communication in which he or she wants to limit transmission for security reasons.

When the obtained setting is a setting set on the communication setting screen 202 in FIG. 7, the control unit 50 performs control, based on the second setting set with the communication setting screen 202 in FIG. 7. The second setting set with the communication setting screen 202 in FIG. 7 is a setting that permits communication using the facsimile communication connection. Since the received transmission instruction is to perform communication using the facsimile communication channel, the control unit 50 permits transmitting the print data. The control unit 50 transmits the specified print data to the facsimile with the predetermined telephone number.

When the transmission destination displayed in the transmission-destination setting field 241 in FIG. 8 is the PC 102 in FIG. 3, the control unit 50 receives the transmission instruction for the PC 102. In the case of the second setting, communication using the Ethernet connection is permitted for the print data specified in the file setting field 221. Since the communication channel from the printer 1 to the PC 102 uses the Ethernet connection, the transmission for the PC 102 is communication using the Ethernet connection. When the control unit 50 receives the transmission instruction for using the Ethernet connection for the communication channel, the control unit 50 transmits the specified print data to the PC 102.

When the second setting corresponds to the print data, and the user's instruction is to transmit the print data through the Ethernet connection, as illustrated in FIGS. 7 and 8, the control unit 50 performs control for transmitting the print data through the Ethernet connection. When the second setting corresponds to the print data, and the user's instruction is to transmit the print data through the facsimile communication connection, the control unit 50 performs control for transmitting the print data through the facsimile communication connection. The user can control transmission for each communication channel. When two channels do not require communication limitation, the user can perform the same setting for the channels.

Figure 9:
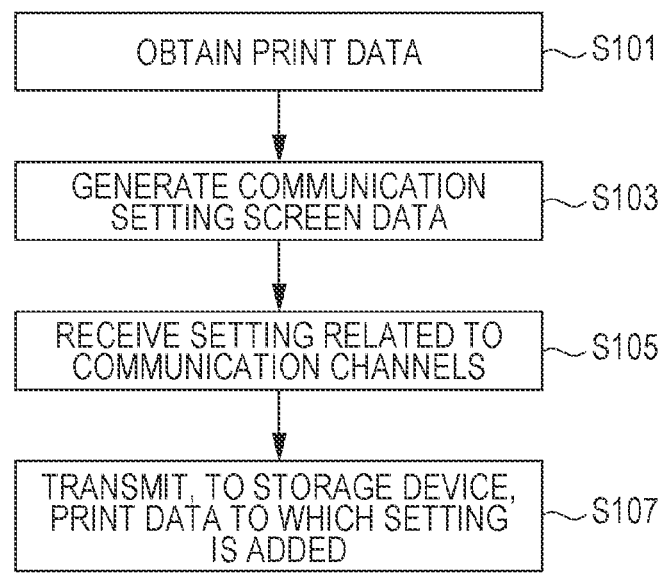
FIG. 9 is a flowchart illustrating a processing flow of print data.

FIG. 9 illustrates a processing flow of the print data. FIG. 9 illustrates a control flow executed by the control unit 50 including the display control unit 51 and the data processing unit 53. FIG. 9 illustrates a control flow when a first user performs communication setting on print data by using the communication setting screen 202 in FIG. 5.

In step S101, the control unit 50 obtains print data. The control unit 50 obtains print data pre-stored in the storage device 40 by the first user. The control unit 50 may pre-receive, via the communication interface 60, the print data that the first user transmits from an external device to the printer 1, and may store the print data in the storage device 40. Examples of the external device include the PC 102, the tablet terminal 104, the HDD 106, the server 112, and the notebook PC 114 illustrated in FIG. 3. When the printer 1 includes the reading unit 10, data read by the reading unit 10 may be obtained as the print data. In this case, any setting related to the communication channels has not been added to the print data that is obtained.

After obtaining the print data, in step S103, the control unit 50 generates communication setting screen data for displaying the communication setting screen 202 with which communication setting is performed on the obtained print data. In one example of the control flow, when print data is specified in the file setting field 221 on the file setting screen 201 illustrated in FIG. 4, and the communication setting button 225 receives an input performed by the first user, the control unit 50 receives a display instruction for displaying the communication setting screen 202. Upon receiving the display instruction, the control unit 50 generates the communication setting-screen data for displaying the communication setting screen 202. The file name displayed in the set-file display field 235 on the communication setting screen 202 is the file name of the obtained print data.

The control unit 50 transmits the generated communication setting-screen data to the display 30 via the input/output interface 70. The display 30 displays the communication setting screen 202, based on the received communication setting-screen data. The communication setting-screen data corresponds to one example of screen information.

After the control unit 50 transmits the communication setting-screen data to the display 30, in step S105, the data processing unit 53 receives the setting related to the communication channels. The setting related to the communication channels is set by the first user's input to the communication setting screen 202 displayed on the display 30. The setting related to the communication channels is a setting associated with communication channels and is one example of a setting related to communication data. The first user performs input to the first communication channel setting field 232A, the second communication channel setting field 232B, the third communication channel setting field 232C, and the fourth communication channel setting field 232D on the communication setting screen 202 in FIG. 5. When the first user performs input to each field and then performs input to the OK button 227, the data processing unit 53 receives the setting related to the communication channels.

After receiving the setting related to the communication channels, the data processing unit 53 adds the setting related to the communication channels to the print data corresponding to the file name displayed in the set-file display field 235. After adding the setting related to the communication channels to the print data, in step S107, the data processing unit 53 transmits, to the storage device 40, the print data to which the setting related to the communication channels is added. The storage device 40 stores the print data to which the setting related to the communication channels is added.

The data processing unit 53 may add a print setting related to printing in the printing unit 20, as in the setting related to the communication channels. The print setting is a setting for causing the printing unit 20 to execute printing or a setting for causing the printing unit 20 not to execute printing. The data processing unit 53 may associate the print setting with the setting related to the communication channels and add the resulting setting to the print data. In one example, when the first setting is added to the print data, the data processing unit 53 adds, as a print setting, a setting for causing the printing unit 20 to execute printing. When the second setting is added to the print data, the data processing unit 53 adds, as a print setting, the setting for causing the printing unit 20 to execute printing.

Figure 10:
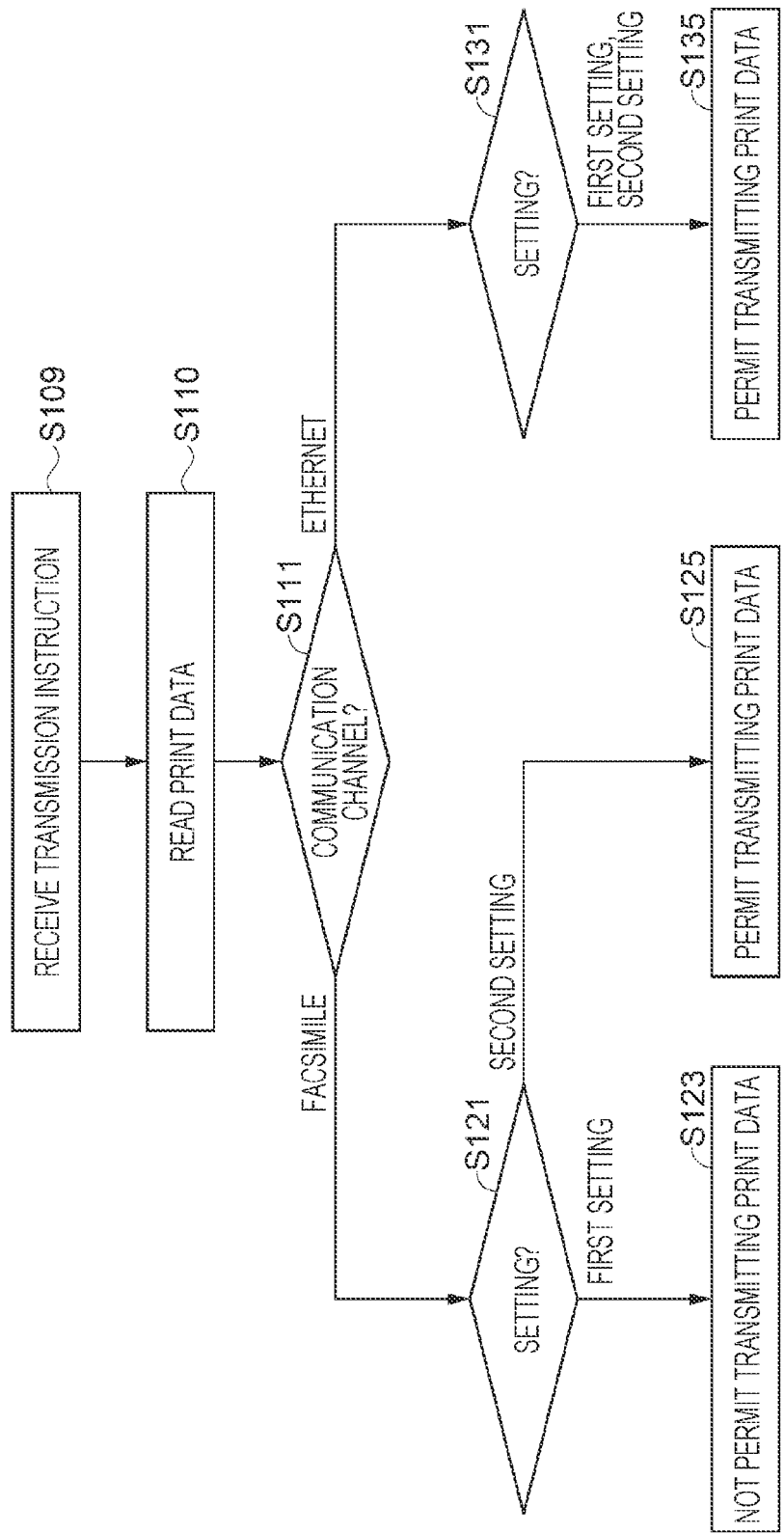
FIG. 10 is a flowchart illustrating a processing flow of the print data.

FIG. 10 illustrates a processing flow of the print data. FIG. 10 illustrates a control flow executed by the control unit 50 including the display control unit 51 and the data processing unit 53. FIG. 10 illustrates a control flow when a second user reads print data to which settings are added, the print data being stored in the storage device 40, and transmits the print data to a predetermined transmission destination. FIG. 10 illustrates a case in which the facsimile 122 or the PC 102 in FIG. 3 is specified as a transmission destination. FIG. 10 illustrates a case in which the print data to which the first setting or the second setting is added is transmitted. The first setting is a setting that permits communication using the Ethernet connection and that does not permit communication using the facsimile communication connection, communication using the Wi-Fi communication connection, and communication using the Internet connection. The second setting is a setting that permits communication using the Ethernet connection, communication using the facsimile communication connection, communication using the Wi-Fi communication connection, and communication using the Internet connection.

In step S109, the control unit 50 receives a transmission instruction for transmitting the print data. The second user specifies the print data by using the transmission-file setting field 242 on the first data transmission execution screen 203A in FIG. 8 and specifies a transmission destination by using the transmission-destination setting field 241. After specifying the print data and the transmission destination, the second user performs input to the send button 245. When a touch sensor of the display 30 receives the input to the send button 245, the control unit 50 receives a transmission instruction for transmitting the print data.

Upon receiving the transmission instruction for transmitting the print data, in step S110, the control unit 50 reads the print data stored in the storage device 40. The print data that is read is print data corresponding to the file name specified in the transmission-file setting field 242 on the first data transmission execution screen 203A.

After reading the print data, the control unit 50 obtains the transmission destination specified by the transmission-destination setting field 241 on the first data transmission execution screen 203A in FIG. 8. In step S111, based on the obtained transmission destination, the control unit 50 determines a communication connection and a communication channel. When the specified transmission destination is the PC 102, the communication connection is the Ethernet connection, and the communication channel is a channel from the printer 1 to the PC 102 through the local area network 100. The communication channel for the Ethernet connection corresponds to one example of a first communication channel. When the specified transmission destination is the facsimile 122, the communication connection is the facsimile communication connection, and the communication channel is a channel from the printer 1 to the facsimile 122 through the telephone communication network 120. The communication channel for the facsimile communication connection corresponds to one example of a second communication channel.

When the control unit 50 determines in step S111 that the communication connection for the transmission destination is the facsimile communication connection, and the communication channel therefor is the second communication channel, the process proceeds to step S121.

In step S121, the control unit 50 obtains the setting related to the communication channels, the setting being added to the print data. When the obtained setting related to the communication channels is the first setting, the control unit 50 advances to step S123. Since the first setting is a setting that permits communication using the Ethernet connection and that does not permit communication using the facsimile communication connection, communication using the Wi-Fi communication connection, and communication using the Internet connection, communication using the facsimile communication connection is not permitted. The control unit 50 transmits, to the display 30, display data for graying out the send button 245 in FIG. 8 and does not permit the second user to perform input to the send button 245. Thus, the second user cannot operate the send button 245 and cannot transmit the print data. The control unit 50 may transmit, to the display 30, a message indicating that transmission of the print data is not permitted. The display 30 receives and displays the message.

When the obtained setting related to the communication channels is the second setting, the control unit 50 advances to step S125. Since the second setting is a setting that permits communication using the Ethernet connection, communication using the facsimile communication connection, communication using the Wi-Fi communication connection, and communication using the Internet connection, communication using the facsimile communication connection is permitted. The control unit 50 transmits data indicating that the second user is permitted to operate the send button 245. When the second user operates the send button 245, the control unit 50 transmits the print data to the transmission destination.

When the control unit 50 determines in step S111 that the communication connection for the transmission destination is the Ethernet connection, and the communication channel therefor is the first communication channel, the process proceeds to step S131.

In step S131, the control unit 50 obtains the setting added to the print data and related to the communication channels. When the obtained setting related to the communication channels is the first setting or the second setting, the process proceeds to step S135. The first setting and the second setting each permit communication using the Ethernet connection. The control unit 50 transmits data indicating that the second user is permitted to operate the send button 245. When the second user operates the send button 245, the control unit 50 transmits the print data to the transmission destination.

When the print setting is added to the print data, the control unit 50 performs control, based on the setting obtained in step S121 or step S131. When the second user specifies the print data to which the print setting is added by using a print execution screen, not illustrated, the control unit 50 reads the print data. When a setting that does not permit printing is added to the print data, the control unit 50 transmits data indicating that printing is not permitted to the display 30 and grays out a print button, included in the print execution screen, to thereby disable printing. When a setting that permits printing is added to the print data, the control unit 50 transmits data indicating that printing is permitted to the display 30 to enable reception of the second user's operation on the print button included in the print execution screen.

Second Embodiment

In a second embodiment, a description will be given of a case in which an administrator who manages the printer 1 performs setting. The administrator corresponds to one example of a user. The printer 1 stores administrator authority information for each user, and determines whether or not a user of the printer 1 is the administrator, based on the stored administrator authority information. Upon determining that the user has a first authority with which an input to the administrator communication setting screen 204, described below, is permitted, the printer 1 determines that the user is the administrator. Upon determining that user has a second authority with which an input to the administrator communication setting screen 204 is not permitted, the printer 1 determines that the user is not the administrator. An operation screen in the second embodiment is a screen that is displayed on the display 30, which has a touch sensor. The configurations of the printer 1 and the printing system 1000 used in the second embodiment are the same as those in the first embodiment. Descriptions of elements denoted by the same reference numerals as those in the first embodiment are not given hereinafter.

Figure 11:
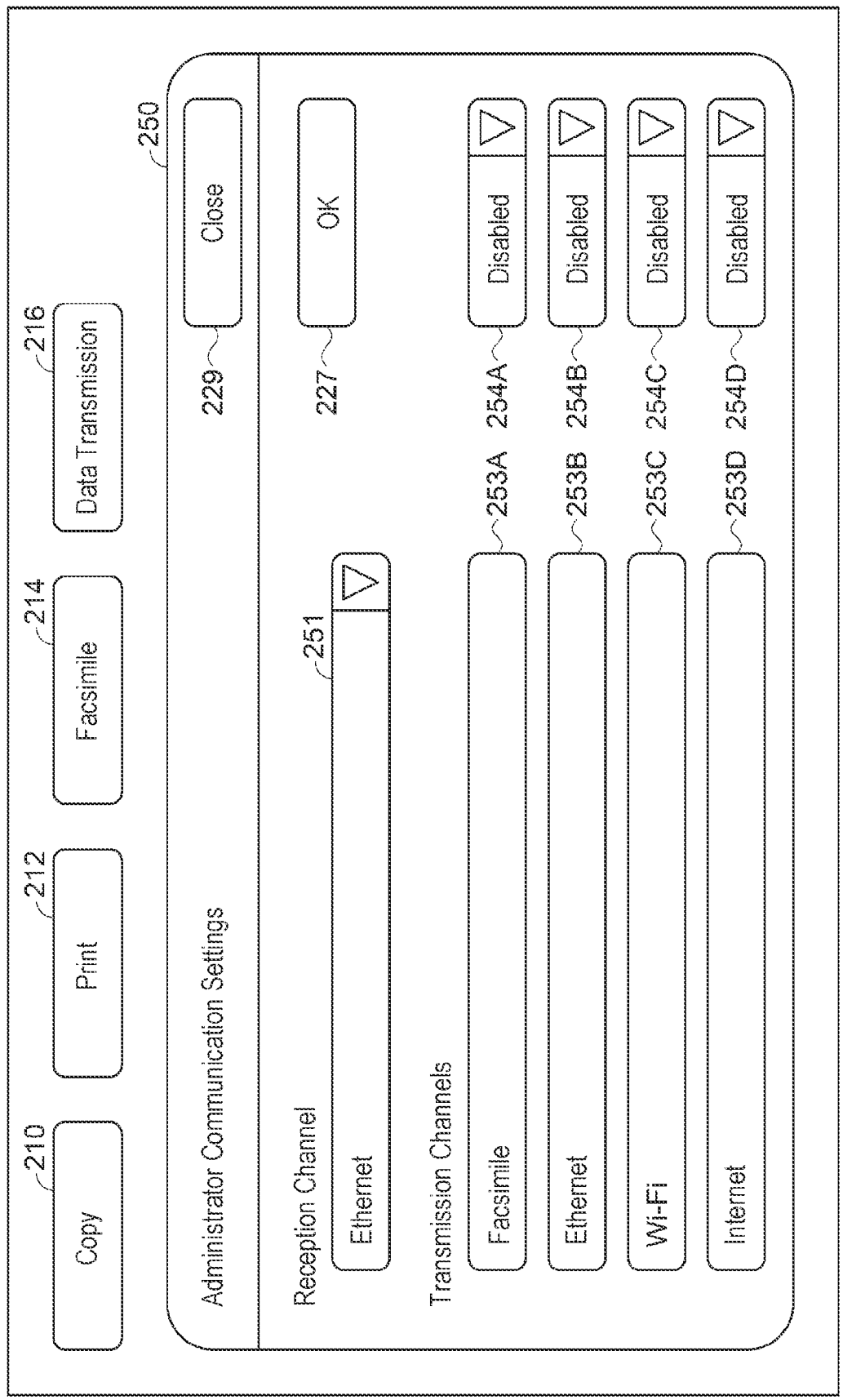
FIG. 11 is a view illustrating an administrator communication setting screen.

FIG. 11 illustrates the administrator communication setting screen 204, which is one of operation screens and is used by the administrator. The administrator communication setting screen 204 is an image that is displayed on the display 30, based on administrator communication setting-screen data that the display control unit 51 transmits to the display 30. The display control unit 51 generates the administrator communication setting screen 204. The administrator communication setting screen 204 corresponds to one example of a setting screen. The administrator communication setting-screen data for causing the administrator communication setting screen 204 to be displayed on the display 30 is one example of display data and corresponds to one example of screen information.

The administrator communication setting screen 204 displays the copy instruction button 210, the print instruction button 212, the facsimile instruction button 214, the data transmission instruction button 216, and an administrator communication setting list 250. The administrator communication setting list 250 is a list image for making the administrator input various settings regarding communication channels. The administrator communication setting list 250 displays a reception channel input field 251, a first transmission-channel display field 253A, a first transmission-channel setting field 254A, a second transmission-channel display field 253B, a second transmission-channel setting field 254B, a third transmission-channel display field 253C, a third transmission-channel setting field 254C, a fourth transmission-channel display field 253D, a fourth transmission-channel setting field 254D, an OK button 227, and a close button 229.

The reception channel input field 251 displays a communication connection associated with a communication channel. The communication connection that is displayed is a communication connection input and specified by the administrator. Examples of the communication connection include an Ethernet connection, an Internet connection, a Wi-Fi communication connection, and a facsimile communication connection. "Ethernet" in FIG. 11 represents the Ethernet connection. The communication connection displayed in the reception channel input field 251 represents a communication connection through which print data is received.

The first transmission-channel display field 253A, the second transmission-channel display field 253B, the third transmission-channel display field 253C, and the fourth transmission-channel display field 253D display communication connections associated with communication channels. The communication connections that are displayed are the Ethernet connection, the Internet connection, the Wi-Fi communication connection, and the facsimile communication connection.

The first transmission-channel setting field 254A displays a setting related to communication using the communication connection displayed in the first transmission-channel display field 253A. The second transmission-channel setting field 254B displays a setting related to communication using the communication connection displayed in the second transmission-channel display field 253B. The third transmission-channel setting field 254C displays a setting related to communication using the communication connection displayed in the third transmission-channel display field 253C. The fourth transmission-channel setting field 254D displays a setting related to communication using the communication connection displayed in the fourth transmission-channel display field 253D. The administrator performs input to the first transmission-channel setting field 254A, the second transmission-channel setting field 254B, the third transmission-channel setting field 254C, and the fourth transmission-channel setting field 254D. The first transmission-channel setting field 254A, the second transmission-channel setting field 254B, the third transmission-channel setting field 254C, and the fourth transmission-channel setting field 254D correspond to one example of a channel-setting input portion.

Although the administrator communication setting list 250 displays four transmission-channel display fields and four transmission-channel setting fields, the present disclosure is not limited thereto. The administrator communication setting list 250 may display three or less transmission-channel display fields and three or less transmission-channel setting fields or may display five or more transmission-channel display fields and five or more transmission-channel setting fields. With respect to a communication channel that is not set on the administrator communication setting screen 204, a setting that permits communication or a setting that does not permit communication may be performed as a default setting. The settings set in this case are reflected in the print data and the communication channel(s) for which "Automatic" is set on the communication setting screen 202.

When the administrator performs input to the OK button 227 in a state in which conditions specified by the administrator are displayed in the respective fields displayed in the administrator communication setting list 250, as illustrated in FIG. 11, the control unit 50 receives administrator settings based on the conditions input to the administrator communication setting screen 204. The administrator settings are settings in which the reception channel of the print data, a transmission channel for the print data, and settings related to communication using the transmission channel are associated with each other. After receiving the administrator settings, the control unit 50 transmits the administrator settings to the storage device 40. The storage device 40 receives the administrator settings from the control unit 50 and stores the administrator settings.

Figure 12A:
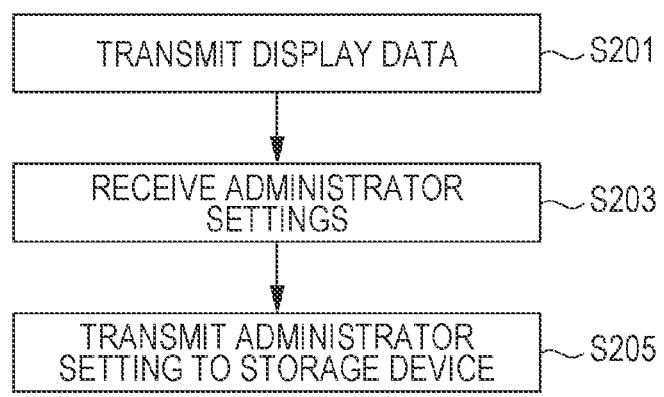
FIG. 12A is a flowchart illustrating generation of administrator settings.
Figure 12B:
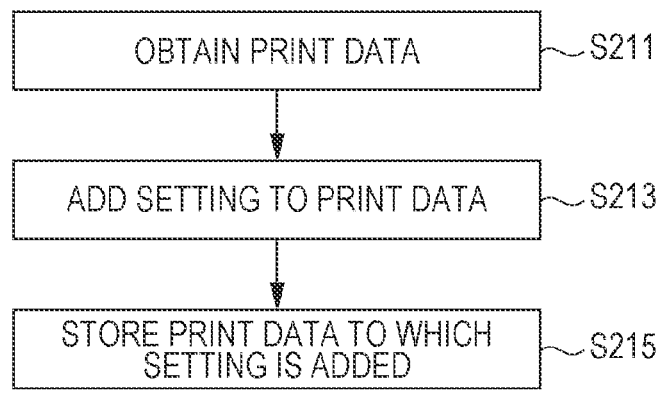
FIG. 12B is a flowchart illustrating a processing flow of the print data.

FIG. 12A illustrates a flow for generating the administrator settings in the second embodiment. FIG. 12B illustrates a processing flow for processing print data in the second embodiment, the processing being performed by the control unit 50 including the display control unit 51 and the data processing unit 53. FIG. 12A is a flow from when the display control unit 51 transmits the administrator communication setting-screen data to the display 30 until the display control unit 51 transmits the administrator settings to the storage device 40. FIG. 12B illustrates a flow for the data processing unit 53 to add settings on the basis of the administrator settings.

In step S201 in FIG. 12A, the control unit 50 generates, as display data, the administrator communication setting-screen data to be displayed on the administrator communication setting screen 204 and transmits the administrator communication setting-screen data to the display 30. The display 30 receives the administrator communication setting-screen data and displays the administrator communication setting screen 204.

After transmitting the administrator communication setting-screen data to the display 30, the control unit 50 receives the administrator settings in step S203 in FIG. 12A. The administrator settings are settings based on the administrator's input to the administrator communication setting screen 204 displayed on the display 30.

After receiving the administrator settings, the control unit 50 transmits the administrator settings to the storage device 40 in step S205 in FIG. 12A. The storage device 40 stores the received administrator settings. The control unit 50 may also store the administrator settings in the control unit 50. The administrator settings corresponds to one example of channel settings related to channel information.

The communication interface 60 receives print data from an external device. The communication interface 60 analyzes the received print data. Based on transmission source information of the received print data, the communication interface 60 determines a reception channel of the print data. Examples of the transmission source information include a private Internet protocol (IP) address, a global IP address, and a telephone number of a sender. The analyzed reception channel corresponds to one example of channel information related to a communication channel. The communication interface 60 adds the determined reception channel to the print data and transmits the print data to the control unit 50.

In step S211, the control unit 50 receives and obtains, from the communication interface 60, the print data to which the reception channel is added. The control unit 50, instead of the communication interface 60, may determine the reception channel.

The control unit 50 reads the administrator settings stored in the storage device 40. Based on the read administrator settings and the reception channel added to the print data, the data processing unit 53 identifies the setting related to the communication channels. In step S213, the data processing unit 53 adds the identified setting related to the communication channels to the received print data. The setting related to the communication channels corresponds to one example of a channel setting related to the channel information.

After adding the setting related to the communication channels to the print data, in step S215, the data processing unit 53 transmits, to the storage device 40, the print data to which the setting related to the communication channels is added. The storage device 40 stores the received print data. The stored print data is similar to the print data transmitted in step S107 in FIG. 9, and the setting related to the communication channels is added to the stored print data. The stored print data can be subjected to the processes in and after step S109 illustrated in FIG. 10.

As described in the second embodiment, the communication interface 60 adds, to the print data, the channel information related to the communication channel through which the received print data was communicated. The administrator communication setting screen 204 has the first transmission-channel display field 253A and so on for making the administrator, who is a user, input channel settings related to the channel information as settings. This allows the administrator to add control-related settings to print data, received by the printer 1, for each communication channel of the print data.

The data processing unit 53 may add the settings to the print data by using the administrator settings and the settings input with the communication setting screen 202 in the first embodiment. The data processing unit 53 may perform setting processing by assigning priorities to the administrator settings and the settings input with the communication setting screen 202 in the first embodiment. In one example, the data processing unit 53 may add the administrator settings to the print data with a higher priority than the settings input with the communication setting screen 202. In another example, the settings in which "Disabled" is selected in the administrator settings may be given priority over settings input with the communication setting screen 202, and settings input with the communication setting screen 202 may be given priority over the settings in which "Enabled" is selected in the administrator settings.

The data processing unit 53 may add the print setting to the print data, based on the reception channel added to the print data by the communication interface 60. In one example, when the reception channel added to the print data corresponds to the facsimile communication connection, the data processing unit 53 adds, to the print data, a setting that permits printing performed by the printing unit 20. When the reception channel added to the print data corresponds to the Ethernet connection in which the transmission destination is the PC 102, the data processing unit 53 adds, to the print data, a setting that does not permit printing performed by the printing unit 20. The administrator may perform setting separately for a setting that is referenced when "Automatic" is selected in the communication setting and for a setting referenced as an initial setting when the print data is obtained for the first time. In this case, a setting that is referenced when "Automatic" is selected in the communication settings may be independent of from where the print data is received, without associating information indicating from where the print data is received with the print data.

Third Embodiment

In a third embodiment, a description will be given of a case in which print data is transmitted using a second data transmission execution screen 203B different from the first data transmission execution screen 203A in FIG. 8. An operation screen in the third embodiment is a screen that is displayed on the display 30, which has a touch sensor. The configurations of the printer 1 and the printing system 1000 used in the third embodiment are the same as those in the first embodiment. The storage device 40 stores a plurality of pieces of print data illustrated in FIG. 13. Descriptions of elements that are denoted by the same reference numerals as those in the first embodiment are not given hereinafter.

FIG. 13 illustrates one example of a database of the print data stored in the storage device 40 and communication settings therefor. Settings have been added to the print data stored in the storage device 40. FIG. 13 illustrates settings related to the communication channels with respect to respective five pieces of print data. The communication connections correspond to the communication channels, as described below. The setting related to each communication channel is a setting that permits or does not permit communication using each communication connection. FIG. 13 illustrates a case in which settings related to communication through four communication channels are added to each piece of print data.

File names in FIG. 13 represent data names of the print data stored in the storage device 40. Each file name is given an extension, such as pdf, jpeg, or the like. "Facsimile", "Ethernet", "Wi-Fi", and "Internet" indicate communication connections displayed in the first communication channel display field 231A, the second communication channel display field 231B, the third communication channel display field 231C, and the fourth communication channel display field 231D, respectively, on the communication setting screen 202 illustrated in FIG. 5. "Enabled", "Disabled", and "Automatic" in FIG. 13 indicate settings input to the first communication channel setting field 232A, the second communication channel setting field 232B, the third communication channel setting field 232C, and the fourth communication channel setting field 232D on the communication setting screen 202 illustrated in FIG. 5.

Figure 14:
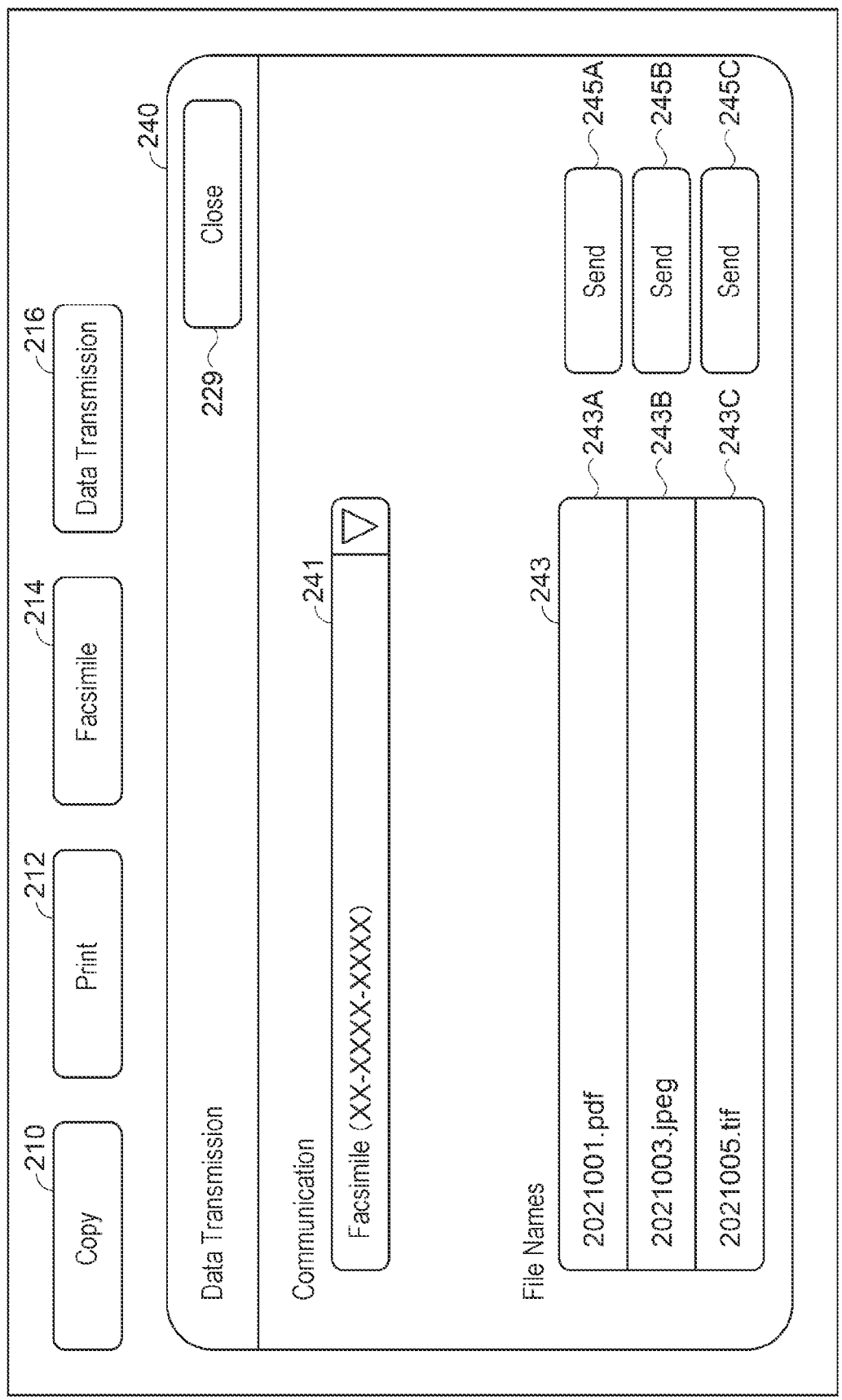
FIG. 14 is a view illustrating another data transmission execution screen.

FIG. 14 illustrates the second data transmission execution screen 203B, which is another data transmission execution screen. The second data transmission execution screen 203B is displayed on the display 30, when the data transmission instruction button 216 receives an input performed by the user. The second data transmission execution screen 203B displays the data transmission setting list 240. The data transmission setting list 240 displays the transmission-destination setting field 241, a file display list 243, a first send button 245A, a second send button 245B, and a third send button 245C. The file display list 243 has a first file display field 243A, a second file display field 243B, and a third file display field 243C.

The first send button 245A receives an input performed by the user. When the first send button 245A receives an input performed by the user, the control unit 50 receives a transmission instruction for transmitting the print data displayed in the first file display field 243A to a transmission destination specified in the transmission-destination setting field 241. When the first send button 245A on the second data transmission execution screen 203B in FIG. 14 receives an input performed by the user, the control unit 50 receives a transmission instruction for transmitting the print data with file name "2021001.pdf" to a facsimile with telephone number XX-XXXX-XXXX.

The second send button 245B receives an input performed by the user. When the second send button 245B receives an input performed by the user, the control unit 50 receives a transmission instruction for transmitting the print data displayed in the second file display field 243B to the transmission destination specified in the transmission-destination setting field 241. When the second send button 245B on the second data transmission execution screen 203B in FIG. 14 receives an input performed by the user, the control unit 50 receives a transmission instruction for transmitting the print data with file name 2021003.jpeg to the facsimile with telephone number XX-XXXX-XXXX.

The third send button 245C receives an input performed by the user. When the third send button 245C receives an input performed by the user, the control unit 50 receives a transmission instruction for transmitting the print data displayed in the third file display field 243C to the transmission destination specified in the transmission-destination setting field 241. When the third send button 245C on the second data transmission execution screen 203B in FIG. 14 receives an input performed by the user, the control unit 50 receives a transmission instruction for transmitting the print data with file name 2021005.tif to the facsimile with telephone number XX-XXXX-XXXX.

The transmission-destination setting field 241 in FIG. 14 indicates a facsimile with a predetermined telephone number as a transmission destination. The facsimile with the predetermined telephone number represents, for example, the facsimile 122 in FIG. 3. When the transmission destination is the facsimile 122, the channel from the printer 1 to the facsimile 122 through the telephone communication network 120 corresponds to the communication channel.

The file display list 243 displays the file names of the print data in the first file display field 243A, the second file display field 243B, and the third file display field 243C. The file names displayed in the first file display field 243A, the second file display field 243B, and the third file display field 243C correspond to the settings related to the communication channels, the settings being added to the print data stored in the storage device 40.

When a transmission destination is input with the transmission-destination setting field 241 on the second data transmission execution screen 203B, the control unit 50 receives first transmission destination information. The first transmission destination information corresponds to one example of a first transmission request. Based on the transmission destination information, the control unit 50 determines a communication connection used for transmitting the print data. In the case in FIG. 14, the transmission destination input to the transmission-destination setting field 241 is a facsimile with a predetermined number. Since the transmission destination is a facsimile, the communication connection is the facsimile communication connection, and the communication channel is the channel from the printer 1 to the facsimile 122 through the telephone communication network 120. The communication connection corresponds to the communication channel.

The control unit 50 reads the print data stored in the storage device 40 and checks the print data to which the setting that permits communication with respect to the determined communication channel is added. In FIG. 13, the file names of the pieces of print data to which the setting that permits communication using the facsimile communication connection is added are file names 2021001.pdf, 2021003.jpeg, and 2021005.tif. The display control unit 51 generates list information to which the file names of the pieces of print data to which the setting that permits communication through the facsimile communication connection is added are added and then transmits the generated list information to the display 30. The display 30 displays the transmitted file names in the first file display field 243A, the second file display field 243B, and the third file display field 243C.

In FIG. 13, the file names of the pieces of print data to which the setting that does not permit communication through the facsimile communication connection is added are 2021002.pdf and 2021004.jpeg. The display control unit 51 does not add, to the list information, the file name of print data to which the setting that does not permit communication through the facsimile communication connection is added. The display control unit 51 does not transmit, to the display 30, the file name of print data to which the setting that does not permit communication through the facsimile communication connection is added. The display 30 does not display a file name that is not transmitted. The file name corresponds to one example of information regarding print data.

When the transmission destination input to the transmission-destination setting field 241 on the second data transmission execution screen 203B in FIG. 14 is the PC 102, the control unit 50 receives second transmission destination information. The second transmission destination information corresponds to one example of a second transmission request. The communication connection is the Ethernet connection. The communication channel is a channel from the printer 1 to the PC 102 in the local area network 100. In FIG. 13, the file names of the pieces of print data to which the setting that permits communication using the Ethernet connection are 2021001.pdf, 2021002.pdf, 2021003.jpeg, and 2021005.tif. The display control unit 51 generates list information to which the file names of print data to which the setting that permits communication using the Ethernet connection is added is added and transmits the list information to the display 30.

The first setting that permits communication using the Ethernet connection and that does not permit communication using the facsimile communication connection is added to the print data with file name 2021002.pdf. When a request for communication using the Ethernet connection is issued, the file name is added to the list information. When a request for communication using the facsimile communication connection is issued, the file name is not added to the list information.

As described in the third embodiment, the control unit 50 generates the list information. When the first setting corresponds to the print data, and the control unit 50 receives, as the user's instruction, a request for transmitting the print data through the communication channel using the Ethernet connection, the control unit 50 adds information regarding the print data to the list information. When the first setting corresponds to the print data, and the control unit 50 receives, as the user's instruction, a request for transmitting the print data through the communication channel using the facsimile communication connection, the control unit 50 does not add the information regarding the print data to the list information. When the print data can be transmitted, the printer 1 can display information to that effect, and when transmission of the print data is limited, the printer 1 does not cause the file display list 243 to display information regarding communication data whose transmission is limited. This allows the user to determine whether or not the print data is print data that can be transmitted, thus making it possible to reduce careless transmission.

Fourth Embodiment

Figure 15:
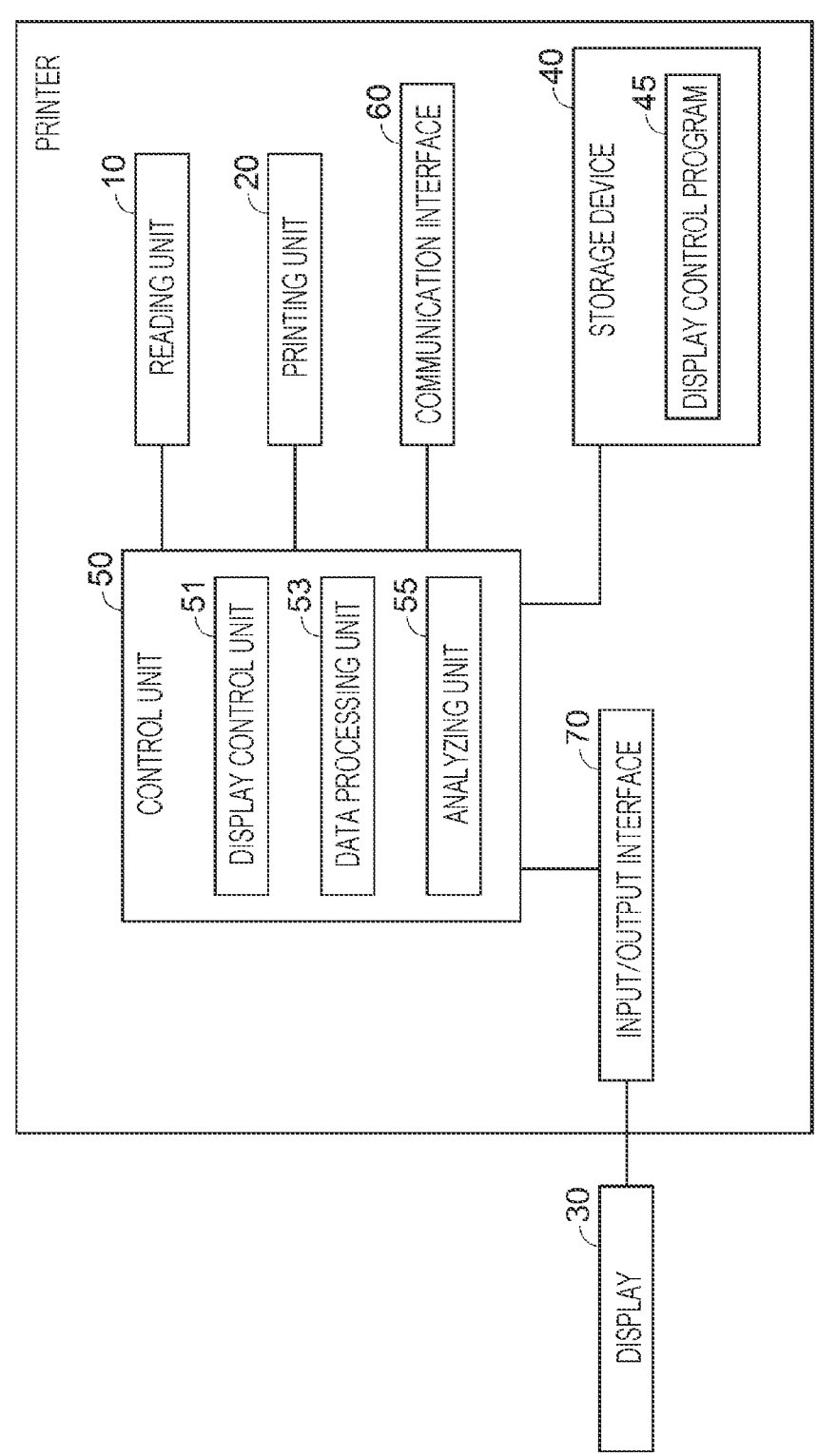
FIG. 15 is a diagram illustrating functional blocks of a printer.

In a fourth embodiment, a description will be given of a case in which transmitting print data to a predetermined communication channel is controlled based on information included in the print data. FIG. 15 illustrates functional blocks of a printer 1 used in the fourth embodiment. The functional blocks in FIG. 15 include an analyzing unit 55 in the control unit 50. The functional blocks other than the analyzing unit 55 are the same as those in FIG. 2.

The analyzing unit 55 analyzes information included in the print data. The information included in the print data is information to be printed to a medium when the printing unit 20 prints the print data. The information printed to the medium is text or an image, such as graphic. The analyzing unit 55 corresponds to one example of an analyzing portion.

Figure 16:
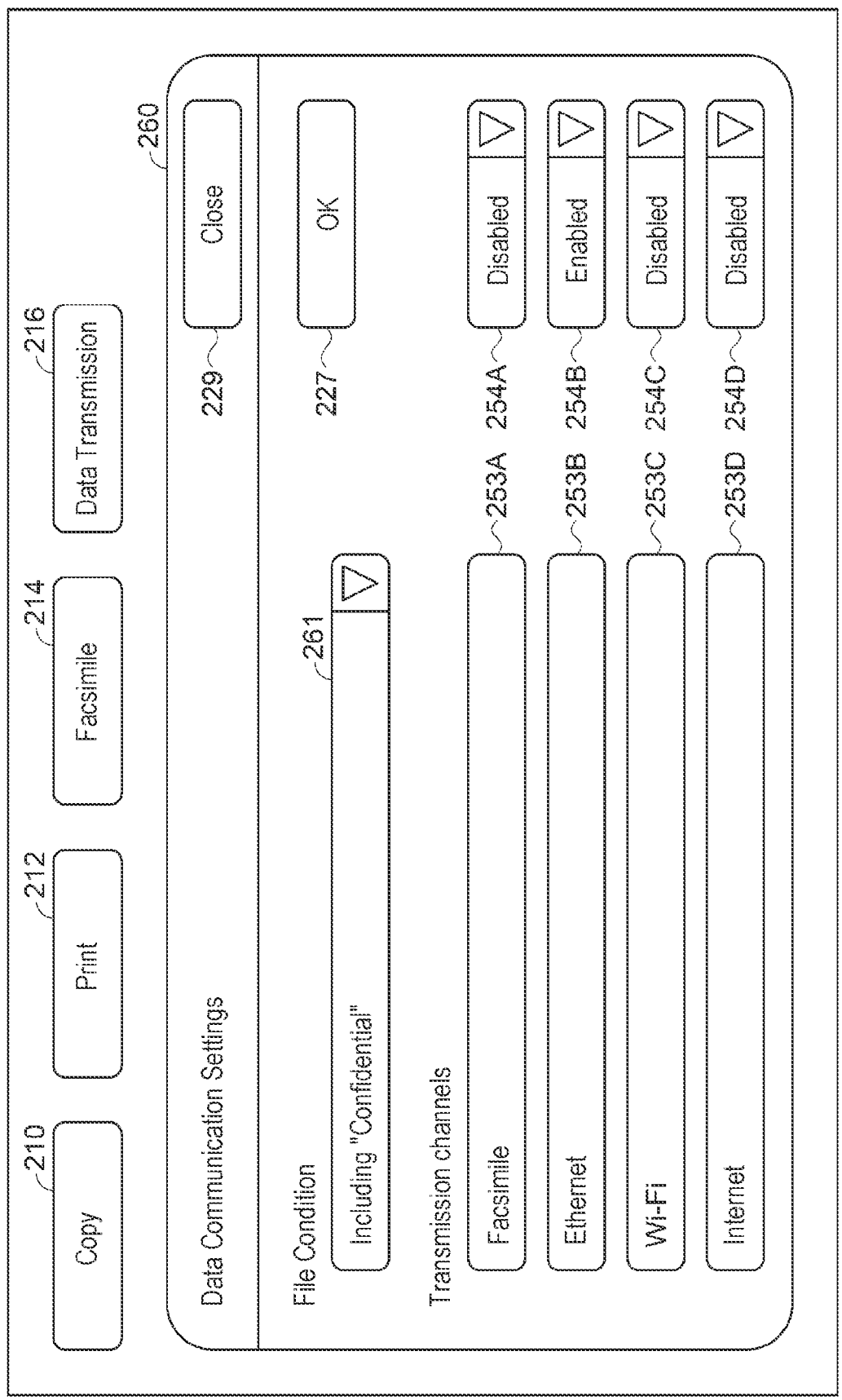
FIG. 16 is a view illustrating a data communication setting screen.

FIG. 16 illustrates a data communication setting screen 205, which is one of the operation screens. The data communication setting screen 205 is an image that is displayed on the display 30, based on data communication setting-screen data that the display control unit 51 transmits to the display 30. The display control unit 51 generates the data communication setting screen 205. The data communication setting screen 205 corresponds to one example of a setting screen. The data communication setting-screen data for causing the data communication setting screen 205 to be displayed on the display 30 is one example of display data and corresponds to one example of screen information. Although the data communication setting screen 205 is a screen with which the administrator performs input, the present disclosure is not limited thereto. Each user may perform inputting by using the data communication setting screen 205.

The data communication setting screen 205 displays the copy instruction button 210, the print instruction button 212, the facsimile instruction button 214, the data transmission instruction button 216, and a data communication setting list

260. The data communication setting list 260 is a list image for making the administrator input various settings related to the communication channels. The data communication setting list 260 displays a condition input field 261, a first transmission-channel display field 253A, a first transmission-channel setting field 254A, a second transmission-channel display field 253B, a second transmission-channel setting field 254B, a third transmission-channel display field 253C, a third transmission-channel setting field 254C, a fourth transmission-channel display field 253D, a fourth transmission-channel setting field 254D, an OK button 227, and a close button 229.

The first transmission-channel display field 253A, the first transmission-channel setting field 254A, the second transmission-channel display field 253B, the second transmission-channel setting field 254B, the third transmission-channel display field 253C, the third transmission-channel setting field 254C, the fourth transmission-channel display field 253D, the fourth transmission-channel setting field 254D, the OK button 227, and the close button 229 are the same as the corresponding fields displayed on the administrator communication setting screen 204 in FIG. 11.

The condition input field 261 displays a condition specified by the administrator. The condition input field 261 is a field to which a condition for content information included in the print data is input. The condition for the content information included in the print data corresponds to one example of content setting. The condition input field 261 corresponds to one example of a content setting input portion.

The administrator may input the condition to the condition input field 261 by selecting the condition in a pull-down list, which is not illustrated. The condition may be input to the condition input field 261 by the administrator inputting text. The condition input field 261 in FIG. 16 displays "Including "Confidential"" input by the administrator.

A setting related to print data having a condition input to the condition input field 261 is input to the first transmission-channel setting field 254A on the data communication setting screen 205. "Enabled", "Disabled", "Confirmation Needed", or the like is input to the first transmission-channel setting field 254A. The "Enabled" indicates a setting that permits communication through the communication channel displayed in the first transmission-channel display field 253A with respect to the print data having the condition input to the condition input field 261. The "Disabled" indicates a setting that does not permit communication through the communication channel displayed in the first transmission-channel display field 253A with respect to the print data having the condition input to the condition input field 261. The "Confirmation Needed" indicates a setting for displaying a confirmation message when the user issues an instruction for communication using the communication channel displayed in the first transmission-channel display field 253A with respect to the print data having the condition input to the condition input field 261. The "Disabled" is input to the first transmission-channel setting field 254A in FIG. 16 and is displayed. The first transmission-channel setting field 254A in FIG. 16 indicates that a setting that does not permit transmitting the print data through the facsimile communication connection is input when the user gives an instruction for transmitting the print data including "Confidential" through the facsimile communication connection, which is a communication channel.

With respect to the print data having the condition input to the condition input field 261, the second transmission-channel setting field 254B displays a setting regarding communication using the communication channel displayed in the second transmission-channel display field 253B. A setting that permits, when the user gives an instruction for transmitting print data including "Confidential" by using the local-area connection, transmitting the print data by using the local-area connection is input to the second transmission-channel setting field 254B in FIG. 16.

With respect to the print data having the condition input to the condition input field 261, the third transmission-channel setting field 254C displays a setting regarding communication using the communication channel displayed in the third transmission-channel display field 253C. A setting that does not permit, when the user gives an instruction for transmitting the print data including "Confidential" by using the Wi-Fi communication connection, transmitting the print data by using the Wi-Fi communication connection is input to the third transmission-channel setting field 254C in FIG. 16.

With respect to the print data having the condition input to the condition input field 261, the fourth transmission-channel setting field 254D displays a setting regarding communication using the communication channel displayed in the fourth transmission-channel display field 253D. When a setting that does not permit, when the user gives an instruction for transmitting the print data including "Confidential" through the Internet connection is input to the fourth transmission-channel setting field 254D in FIG. 16, transmitting the print data through the Internet connection.

When the administrator performs input to the OK button 227 in a state in which the condition and setting specified by the administrator are displayed in the individual fields displayed in the data communication setting list 260, as illustrated in FIG. 16, the control unit 50 receives data settings, based on the content displayed on the data communication setting screen 205. The data settings are settings in which the transmission channel of the print data, content information included in the print data, and settings related to the print data including the content information are associated with each other. After receiving the data settings, the control unit 50 transmits the data settings to the storage device 40. The storage device 40 receives the data settings from the control unit 50 and stores the data settings. The data settings correspond to one example of initial values.

The administrator may cause the data communication setting screen 205 to be displayed on the display 30 again and may set a different condition. When the administrator performs setting for each communication channel with respect to a different condition and then performs input to the OK button 227, the control unit 50 receives second data settings based on the content displayed on the data communication setting screen 205. The second data settings are settings in which the transmission channel of print data, the content information included in the print data, and settings related to the print data including the content information are associated with each other. After receiving the second data settings, the control unit 50 transmits the second data settings to the storage device 40. The storage device 40 receives the second data settings from the control unit 50 and stores the second data.

After the storage device 40 stores the data settings, the printer 1 receives the print data from an external device via the communication interface 60. After the printer 1 receives the print data, the analyzing unit 55 reads the data settings from the storage device 40 and analyzes the received print data. The analyzing unit 55 analyzes whether or not the received print data includes content information included in the data settings. The analyzing unit 55 performs analysis of text included in the print data, analysis of an image included in the print data, and so on. Although the analysis performed by the analyzing unit 55 is, for example, analysis as to whether or not a predetermined character string is included in optical character recognition (OCR) processing or analysis as to whether or not a predetermined flag is set in the print data, the present disclosure is not limited thereto.

When the analyzing unit 55 analyzes that the received print data includes the content information, the data processing unit 53 adds the settings included in the data settings to the received print data. When the analyzing unit 55 analyzes that the received print data does not include the content information, the data processing unit 53 does not add the setting regarding the data settings to the received print data. One of the data settings based on the content displayed on the data communication setting screen 205 in FIG. 16 is a setting in which the communication channel is the facsimile communication connection, the content information is information "Including "Confidential"", and the setting related to the content information is a setting that does not permit communication. The data processing unit 53 adds a setting that does not permit communication using the facsimile communication connection to the received print data. The data processing unit 53 adds a setting for another transmission channel to the print data.

As described above, the printer 1 includes the analyzing unit 55 that analyzes the content information. The data processing unit 53 uses settings based on a result of the analysis of the content information as initial values to be associated with the print data. This allows the administrator to set print data in accordance with the content information included in the print data. In one example, a setting that disables transmission can be performed when a term, such as "Confidential", is included in the print data.

The storage device 40 may store the data settings and the administrator settings in the second embodiment. The data processing unit 53 reads the data settings and the administrator settings and adds settings to the print data, based on the data settings and the administrator settings. The data processing unit 53 may add the settings by giving priority to the administrator settings over the data settings. The setting addition based on the result of the analysis may be performed when the print data is obtained for the first time and/or when communication for which "Automatic" is selected is to be performed or may be performed at another timing.

Fifth Embodiment

In a fifth embodiment, a description will be given of a case in which when the printer 1 in the second embodiment receives print data, the printer 1 automatically adds settings to the print data and transmits the print data to which the settings are added to an external device.

The printer 1 pre-stores the administrator settings in the storage device 40. The printer 1, which stores the administrator settings, receives the print data from the external device via the communication interface 60. The administrator settings corresponds to one example of related information.

The communication interface 60 receives the print data from the external device. The communication interface 60 analyzes the received print data. Based on the transmission source information of the received print data, the communication interface 60 determines a reception channel of the print data. Examples of the transmission source information include a private Internet protocol (IP) address, a global IP address, and a telephone number of a sender. The analyzed reception channel corresponds to one example of channel information. The communication interface 60 adds the determined reception channel to the print data and transmits the print data to the control unit 50.

The data processing unit 53 adds a setting to the received print data, based on at least one of the administrator settings and the data settings. After the data processing unit 53 adds the settings to the print data, the control unit 50 transmits the print data to an external device via the communication interface 60, based on the added settings. The transmission destination of the print data is pre-stored in the control unit 50. The control unit 50 determines whether or not the settings added to the print data permit communication to the pre-stored transmission destination. When the settings added to the print data are settings that permit communication to the pre-stored transmission destination, the control unit 50 transmits the print data to the transmission destination. When the settings added to the print data are settings that do not permit communication to the pre-stored transmission destination, the control unit 50 does not transmit the print data to the transmission destination.

As described above, in the printer 1, the data processing unit 53 associates the setting that the communication interface 60 receives in association with the print data with the print data. This allows the printer 1 to perform control on the print data on the basis of the administrator settings upon receiving the print data.

Sixth Embodiment

In a sixth embodiment, a description will be given of a printing system 1000 in which the HDD 106 in FIG. 3 is used instead of the storage device 40. The HDD 106 functions as an external storage device of the printer 1.

The HDD 106 stores print data to which settings are added by the data processing unit 53. The HDD 106, instead of the storage device 40, may store various types of information, such as the administrator settings and the data settings. The HDD 106 stores, as display data, the setting-screen data for causing a setting screen to be displayed on the display 30.

Upon receiving a request for reading the setting-screen data, the print data, or the like stored in the control unit 50 in the printer 1, the HDD 106 transmits the stored setting-screen data, print data, or the like to the printer 1, based on the received request. The printer 1 receives the setting-screen data, the print data, or the like via the communication interface 60. Upon receiving the setting-screen data, the display control unit 51 in the printer 1 transmits the setting-screen data to the display 30.

As described above, the printing system 1000 includes the printer 1 and the HDD 106. The printer 1 includes: the communication interface 60 that transmits and receives print data; the data processing unit 53 that associates a setting corresponding to a user's input via a setting screen with the print data received by the communication interface 60; the control unit 50 that performs control related to communication of the print data, based on the setting corresponding to the print data; the printing unit 20 that performs printing; and the storage device 40 in which the setting and the print data are stored in association with each other. This allows the user to perform control-related settings on the print data received by the printer 1.

The functions of the control unit 50 in each embodiment described above may be realized by one or more processors or one or more semiconductor chips. The control unit 50 may have a configuration further including a sub-processing device (a co-processor), such as a system-on-a-chip (SoC), a micro control unit (MCU), or a field-programmable gate array (FPGA). The control unit 50 may perform various types of control by causing both a CPU and the sub-processing device to cooperate with each other or by selectively using one thereof. In addition, all the functions in each embodiment may be realized by one apparatus or may be realized by being shared by a plurality of apparatuses. For example, the printer may be mainly responsible for only functions of a user interface (UI) that receives the user's operation and functions for executing printing, the printer may notify a separately provided server about the user's input to thereby cause the server to perform setting and to store the setting, and the printer may read the setting stored by the server and perform control according to the setting.

Units of processing in the flowcharts in FIGS. 9, 10, 12A, and 12B are units divided according to main processing details in order to facilitate the understanding of the processing in the printer 1, and the way of dividing the units of processing and the names thereof do not limit the present disclosure. The processes in the individual steps may be divided into a larger number of units of processing, depending on the processing details. The division may be performed so that one unit of processing includes a larger number of processes. The order of the processes may be inter-changed as appropriate, as long as such a change does not cause a problem to the spirit of the present disclosure. The embodiments described above may be combined together, as appropriate.

What is claimed is:

1. A printing apparatus that displays a setting screen on a display portion, the printing apparatus comprising:
    a communication interface that transmits and receives communication data through a plurality of communication channels including a first communication channel and a second communication channel;
    a processor including a setting portion that associates, with the communication data received by the communication interface, a setting of whether or not transmission of the communication data through the first communication channel is enabled and whether or not transmission of the communication data through the second communication channel is enabled, the setting corresponding to a user's input via the setting screen;
    a computer memory in which the communication data and the setting are stored in association with each other; and
    a printing portion that includes a printing head and performs printing,
    the processor performing control related to communication of the communication data, based on the stored setting.

2. The printing apparatus according to claim 1, wherein the communication interface adds channel information to the communication data, the channel information being related to the communication channel through which the received communication data was communicated, and
    the setting screen has a channel-setting input portion with which the user inputs, as the setting, a channel setting related to the channel information.

3. The printing apparatus according to claim 1, wherein the setting is
    a first setting that permits transmitting the communication data through the first communication channel and that does not permit transmitting the communication data through the second communication channel or
    a second setting that permits transmitting the communication data through the first communication channel and that permits transmitting the communication data through the second communication channel; and
    the processor performs control for transmitting the communication data, based on the user's instruction.

4. The printing apparatus according to claim 3, wherein the processor
    performs control for transmitting the communication data through the first communication channel, when the first setting corresponds to the communication data, and the user's instruction is to transmit the communication data through the first communication channel, and
    performs control for not transmitting the communication data through the second communication channel, when the first setting corresponds to the communication data, and the user's instruction is to transmit the communication data through the second communication channel.

5. The printing apparatus according to claim 3, wherein the processor
    performs control for transmitting the communication data through the first communication channel, when the second setting corresponds to the communication data, and the user's instruction is to transmit the communication data through the first communication channel, and
    performs control for transmitting the communication data through the second communication channel, when the second setting corresponds to the communication data, and the user's instruction is to transmit the communication data through the second communication channel.

6. The printing apparatus according to claim 3, wherein the processor generates list information;
    when the first setting corresponds to the communication data, and the processor receives, as the user's instruction, a first transmission request for transmitting the communication data through the first communication channel, the control unit adds information regarding the communication data to the list information; and
    when the first setting corresponds to the communication data, and the processor receives, as the user's instruction, a second transmission request for transmitting the communication data through the second communication channel, the control unit does not add the information regarding the communication data to the list information.

7. The printing apparatus according to claim 1, wherein the processor further includes an analyzing portion that analyzes content information in the communication data, and
    the setting portion uses the setting based on a result of the analysis of the content information as an initial value to be associated with the communication data.

8. The printing apparatus according to claim 1, wherein the setting portion associates the setting that the communication interface receives in association with the communication data with the communication data.

9. A printing system including a printing apparatus and a storage device, the printing system comprising:
    a communication interface that transmits and receives communication data through a plurality of communication channels including a first communication channel and a second communication channel;

a processor including a setting portion that associates, with the communication data received by the communication interface, a setting of whether or not transmission of the communication data through the first communication channel is enabled and whether or not transmission of the communication data through the second communication channel is enabled, the setting corresponding to a user's input via a setting screen;

a printing portion that includes a printing head and performs printing; and a computer memory in which the setting and the communication data are stored in association with each other, the processor performing control related to communication of the communication data, based on the setting corresponding to the communication data.

* * * * *